(12) United States Patent
Hua et al.

(10) Patent No.: US 10,866,678 B2
(45) Date of Patent: Dec. 15, 2020

(54) METHOD FOR RESPONDING TO TOUCH OPERATION AND ELECTRONIC DEVICE

(71) Applicant: GUANGDONG OPPO MOBILE TELECOMMUNICATIONS CORP., LTD., Guangdong (CN)

(72) Inventors: Chunqiao Hua, Guangdong (CN); Guojun Sun, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/442,522

(22) Filed: Jun. 16, 2019

(65) Prior Publication Data
US 2019/0302961 A1   Oct. 3, 2019

Related U.S. Application Data

(63) Continuation of application No. 16/124,349, filed on Sep. 7, 2018, now Pat. No. 10,698,533.

(30) Foreign Application Priority Data

Sep. 11, 2017 (CN) ............ 2017 1 0813530
Sep. 11, 2017 (CN) ............ 2017 1 0813551
Sep. 11, 2017 (CN) ............ 2017 1 0830133

(51) Int. Cl.
*G06F 3/041* (2006.01)
*G06F 3/0488* (2013.01)

(52) U.S. Cl.
CPC .......... *G06F 3/0418* (2013.01); *G06F 3/0488* (2013.01); *G06F 3/04883* (2013.01); *G06F 3/04886* (2013.01)

(58) Field of Classification Search
CPC .. G06F 3/0418; G06F 3/0488; G06F 3/04883; G06F 3/04886
See application file for complete search history.

(56) References Cited

U.S. PATENT DOCUMENTS 6,201,948 B1   3/2001   Cook et al.
9,244,545 B2   1/2016   Hinckley et al.
(Continued)

FOREIGN PATENT DOCUMENTS

CN   102520876   6/2012
CN   102681779   9/2012
(Continued)

OTHER PUBLICATIONS

SIPO, First Office Action for CN Application No. 201710830133, dated Sep. 26, 2018.
(Continued)

*Primary Examiner* — Peter D McLoone
(74) *Attorney, Agent, or Firm* — Hodgson Russ LLP

(57) ABSTRACT

The present disclosure provides a method and a device for responding to a touch operation, belonging to the field of man-machine interface. The method includes the followings. A usage scenario of a mobile terminal is determined. A first touch operation and a second touch operation applied on a touch display screen within a predetermined duration are received. A first operation type of the first touch operation is determined. A second operation type of the second touch operation is determined. It is determined whether to respond to the first touch operation and/or the second touch operation based on the first operation type, the second operation type and the usage scenario.

20 Claims, 18 Drawing Sheets

(56) References Cited

U.S. PATENT DOCUMENTS

| | | | | |
|---|---|---|---|---|
| 2009/0191854 | A1* | 7/2009 | Beason | H04M 1/04 455/418 |
| 2012/0262407 | A1 | 10/2012 | Hinckley et al. | |
| 2013/0300704 | A1* | 11/2013 | Takahashi | G06F 3/017 345/173 |
| 2016/0253039 | A1 | 9/2016 | Heo et al. | |
| 2016/0364600 | A1 | 12/2016 | Shah et al. | |

FOREIGN PATENT DOCUMENTS

| | | |
|---|---|---|
| CN | 102999198 | 3/2013 |
| CN | 103577029 | 2/2014 |
| CN | 103616970 | 3/2014 |
| CN | 104169856 | 11/2014 |
| CN | 104615303 | 5/2015 |
| CN | 104615374 | 5/2015 |
| CN | 104635972 | 5/2015 |
| CN | 104679362 | 6/2015 |
| CN | 104714691 | 6/2015 |
| CN | 104933048 | 9/2015 |
| CN | 105183235 | 12/2015 |
| CN | 105245650 | 1/2016 |
| CN | 105487809 | 4/2016 |
| CN | 105573637 | 5/2016 |
| CN | 105653085 | 6/2016 |
| CN | 105786391 | 7/2016 |
| CN | 105824559 | 8/2016 |
| CN | 105867789 | 8/2016 |
| CN | 105975160 | 9/2016 |
| CN | 106406904 | 2/2017 |
| CN | 106527818 | 3/2017 |
| CN | 106534555 | 3/2017 |
| CN | 106598335 | 4/2017 |
| CN | 106598455 | 4/2017 |
| CN | 106681637 | 5/2017 |
| CN | 106708407 | 5/2017 |
| CN | 106775407 | 5/2017 |
| CN | 106855782 | 6/2017 |
| CN | 106855783 | 6/2017 |
| CN | 106855784 | 6/2017 |
| CN | 106951161 | 7/2017 |
| CN | 107577415 | 1/2018 |
| CN | 107608550 | 1/2018 |
| CN | 107608551 | 1/2018 |
| KR | 20050088512 | 9/2005 |
| KR | 20160071663 | 6/2016 |

OTHER PUBLICATIONS

SIPO, First Office Action for CN Application No. 201710813551, dated Apr. 16, 2019.
SIPO, First Office Action for Cn Application No. 201710813530, dated May 23, 2019.
WIPO, ISR for PCT/CN2017/101285, Jun. 11, 2018.
WIPO, ISR for PCT/CN2017/101269, May 18, 2018.
WIPO, ISR for PCT/CN2017/101281, Jun. 11, 2018.
WIPO, English Translation of the ISR and WO for PCT/CN2018/104997, Dec. 13, 2018.
EPO, Office Action for EP Application No. 18193721, dated Feb. 12, 2019.
SIPO, Notification to Grant Patent Right for Invention for CN Application No. 201710830133, dated Dec. 19, 2018.
USPTO, Office Action for U.S. Appl. No. 16/124,349, dated Aug. 8, 2019.
USPTO, Notice of Allowance for U.S. Appl. No. 16/124,349, dated Mar. 2, 2020.
EPO, Search Report for EP Application No. 17924699.6, dated Jul. 7, 2020.
EPO, Search Report for EP Application No. 17924123.7, dated Jul. 6, 2020.
EPO, Search Report for EP Application No. 17924544.4, dated Jul. 4, 2020.

* cited by examiner

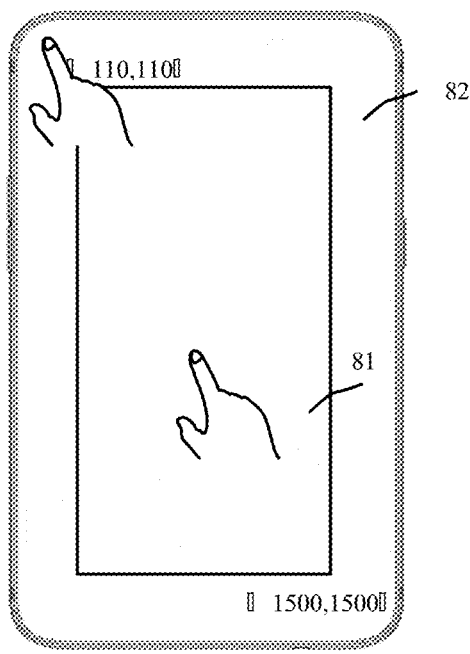

Fig. 8

| first operation region | second operation region | response rule |
|---|---|---|
| existing touch operation | no operation | responding to the touch operation applied on the first operation region |
| no operation | existing touch operation | responding to the touch operation applied on the second operation region |
| existing touch operation | existing touch operation | responding to the touch operation applied on the first operation region; not responding to the touch operation applied on the second operation region |

Fig. 9

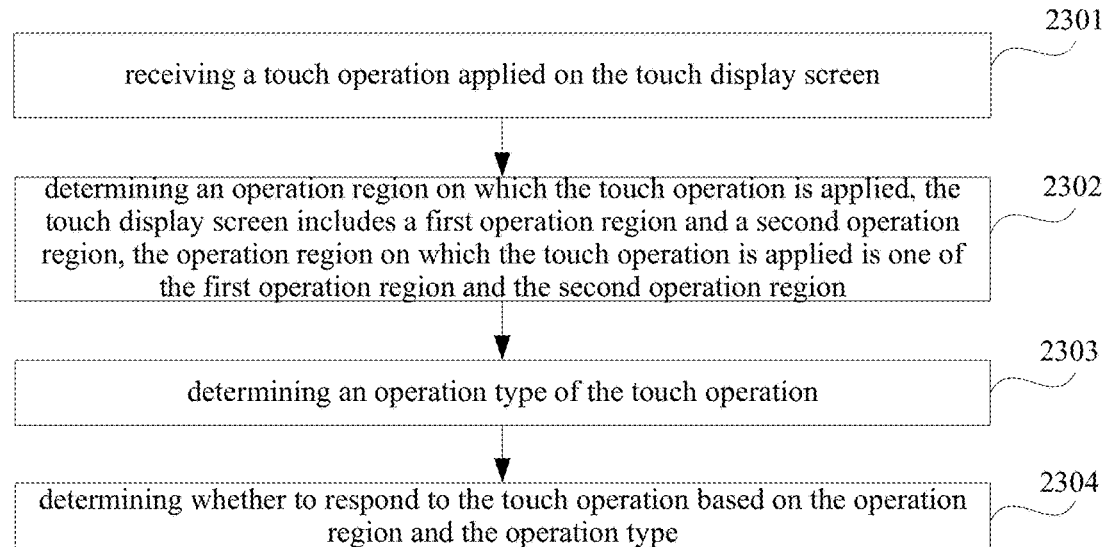

Fig. 23

| first operation region | second operation region | response rule |
|---|---|---|
| click typed touch operation | no operation | responding to the click typed touch operation applied on the first operation region |
| | click typed touch operation | |
| | slide typed touch operation | |
| | long press typed touch operation | |
| slide typed touch operation | no operation | responding to the slide typed touch operation applied on the first operation region |
| | click typed touch operation | |
| | slide typed touch operation | |
| | long press typed touch operation | |
| long press typed touch operation | no operation | responding to long press typed touch operation applied on first operation region |
| | click typed touch operation | responding to the touch operation applied on the second operation region |
| | slide typed touch operation | |
| | long press typed touch operation | responding to long press typed touch operation applied on first operation region |
| no operation | click typed touch operation | responding to click typed touch operation applied on second operation region |
| | slide typed touch operation | responding to slide typed touch operation applied on second operation region |
| | long press typed touch operation | not responding to any touch operation |

Fig. 24

METHOD FOR RESPONDING TO TOUCH OPERATION AND ELECTRONIC DEVICE

CROSS REFERENCE TO RELATED APPLICATION

This application is a continuation of U.S. patent application Ser. No. 16/124,349, filed Sep. 7, 2018, which claims priority to Chinese Patent Application Nos. 201710813530.1, 201710813551.3, and 201710830133.5, each filed Sep. 11, 2017. The entire disclosures of the aforementioned patent applications are incorporated herein by reference.

TECHNICAL FIELD

The present disclosure relates to the field of the man-machine interface, and more particular to a method and a device for responding to a touch operation.

BACKGROUND

In order to improve a utilization rate of a touch display screen of a mobile terminal, frames of a front panel of the mobile terminal are narrower and narrower, thereby increasing a screen ratio of the mobile terminal. A representation of the screen ratio is a ratio of the area of the touch screen to the area of the front panel of the mobile terminal.

SUMMARY

A method for responding to a touch operation is provided. The method is applicable to a mobile terminal. The mobile terminal includes a touch display screen. The method includes:
receiving a first touch operation applied on the touch display screen and a second touch operation applied on the touch display screen within a predetermined duration;
determining a first operation type of the first touch operation;
determining a second operation type of the second touch operation; and
determining whether to respond to the first touch operation and/or the second touch operation based on the first operation type and the second operation type.

A non-transitory computer readable storage medium having instructions stored thereon is provided. When the program instructions are executed by a processor, the above method for responding to a touch operation is executed.

An electronic device is provided. The electronic device includes a processor, a memory coupled to the processor and program instructions stored in the memory. When the program instructions are executed by the processor, the processor is configured to:
determine a first operation region of the touch display screen and a second operation region of the touch display screen;
receive a touch operation applied on the touch display screen;
determine an operation region on which the touch operation is applied, the operation region being one of the first operation region and the second operation region;
determine an operation type of the touch operation; and
determine whether to respond to the touch operation according to the operation region on which the touch operation is applied and according to the operation type.

BRIEF DESCRIPTION OF THE DRAWINGS

In order to explicitly illustrate technical solutions in embodiments of the present disclosure, a brief introduction for the accompanying drawings used when describing the embodiments will be made as follows. Apparently, the drawings described below are only corresponding to some embodiments of the present disclosure, and those skilled in the art may obtain other drawings according to these drawings without creative labor.

FIG. 8 is a schematic diagram illustrating a first operation region and a second operation region provided in an embodiment of the present disclosure;

FIG. 9 is a schematic diagram illustrating a response rule provided in an embodiment of the present disclosure;

FIG. 23 is a flow chart illustrating a method for responding to a touch operation provided in an embodiment of the present disclosure;

FIG. 24 is a schematic diagram illustrating a response rule provided in an embodiment of the present disclosure;

DETAILED DESCRIPTION

In order to make purposes, technical solutions and advantages of the present disclosure more apparent, detailed descriptions will be made to implementations of the present disclosure with reference to drawings.

Terms used in the present disclosure will be described herein.

An application scenario of the present disclosure is described below.

Figure 1A:
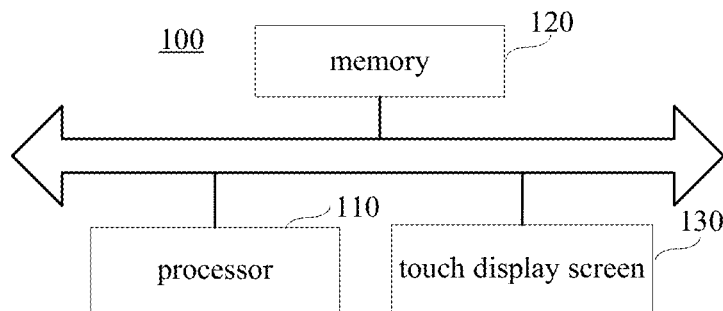
FIGS. 1A to 2 are block diagrams illustrating a mobile terminal provided in an exemplary embodiment of the present disclosure.

Referring to FIG. 1A, FIG. 1A is a block diagram illustrating a mobile terminal 100 provided in an exemplary embodiment of the present disclosure. The mobile terminal 100 may be a phone, a tablet computer, a laptop, an E-book or the like. The mobile terminal 100 in the present disclosure may include one or more of following components: a processor 110, a memory 120 and a touch display screen 130.

The processor 110 may include one or more processing cores. The processor 110 is configured to connect each part of the whole mobile terminal 100 with various interfaces and wires, and to execute various functions of the mobile terminal and to process data by running or executing instructions, programs, a set of codes or a set of instructions stored in the memory 120 and by calling data stored in the memory 120. Optionally, the processor 110 may be implemented in hardware, such as at least one of a digital signal processing (DSP), a field-programmable gate array (FPGA), a programmable logic array (PLA). The processor 110 may be integrated with one of a central processing unit (CPU), a graphics processing unit (GPU) and a modem or may be integrated with a combination thereof. The CPU is configured to mainly process an operating system, a user interface, an application and the like. The GPU is configured to render and draw content to be displayed on the touch display screen 130. The modem is configured to process wireless communication. It may be understood that, the above modem may be also not integrated with the processor 110, and may be implemented as a single chip.

The memory 120 may include a random access memory (RAM), and may also include a read-only memory. Optionally, the memory 120 includes a non-transitory computer readable storage medium. The memory 120 may be configured to store instructions, programs, codes, a set of codes and a set of instructions. The memory 120 may include a program storing region and a data storing region. The program storing region may be configured to store instructions for implementing the operating system, instructions for at least one function (such as touch and control function, voice playing function, image displaying function and the like), and instructions for realizing following method embodiments. The data storing region may be configured to store data (such as audio data, telephone directory) created according to usage of the mobile terminal 100.

Figure 1B:
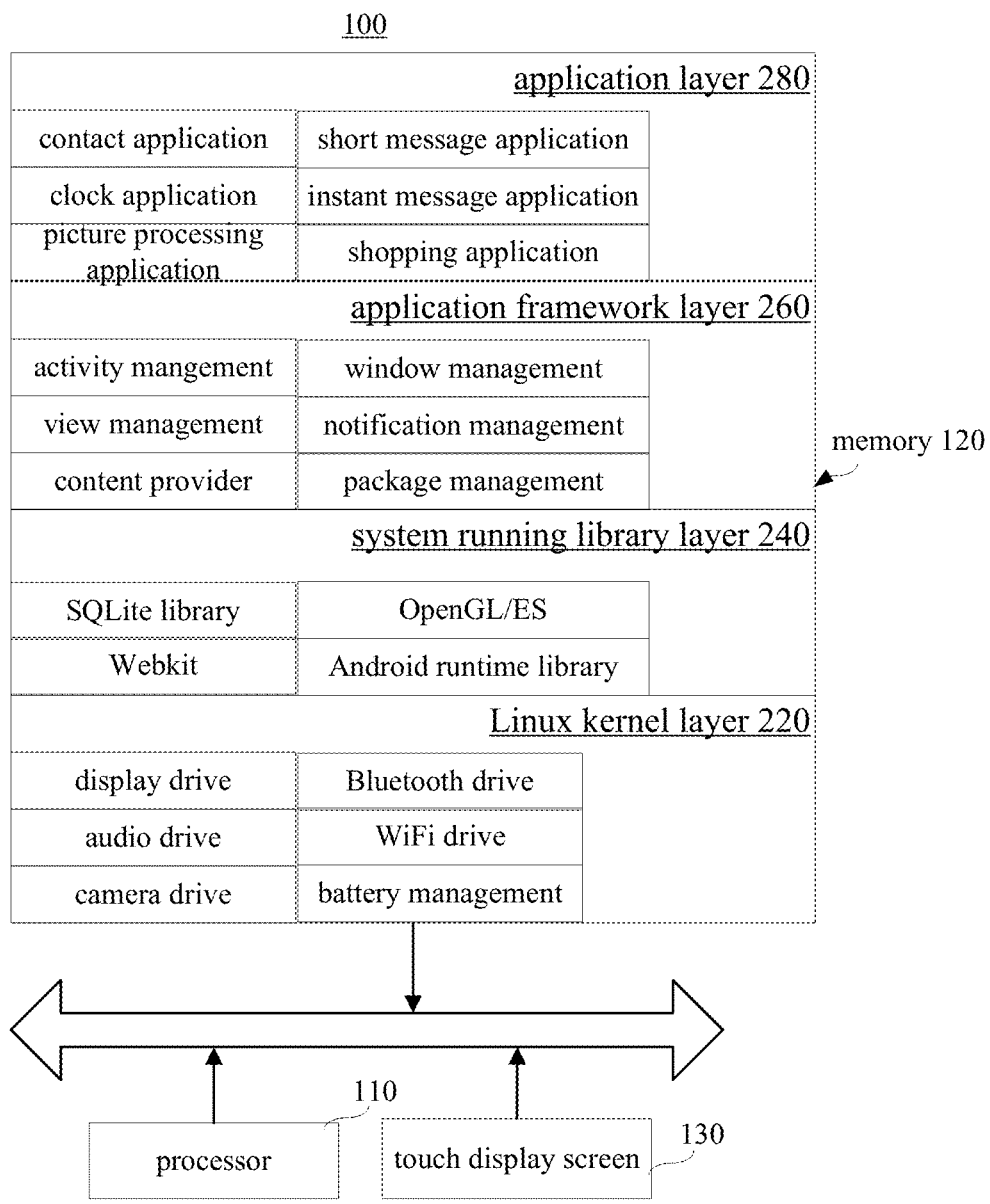

Taking Android system to be the operating system as an example, the programs and the data stored in the memory 120 are illustrated in FIG. 1B. Linux kernel layer 220, system running library layer 240, application framework layer 260 and application layer 280 are included in the memory 120. The Linux kernel layer 220 is configured to provide underlying drives for various hardware of the mobile terminal 100, such as a display drive, au audio drive, a camera drive, a Bluetooth drive, a WiFi drive, a battery management and the like. The system running library layer 240 is configured to provide main characteristic support for Android system using C/C++ libraries. For example, SQLite library is used to provide supports for databases, OpenGL/ES library is used to provide supports for 3D drawings, and Webkit library is used to provide supports for browser kernels. The system running library layer 240 is further provided with an Android runtime library which is configured to mainly provide some core libraries, allowing developers to develop Android applications with Java languages. The application framework layer 260 is configured to provide various APIs which may be used for building applications. The developer may also be able to build his applications with these APIs, such as activity management, window management, view management, notification management, content provider, package management, call management, resource management, positioning management. At least one application runs in the application layer 280. The at least one application may be a contact application, a short message service, a clock application, a camera application that are manufactured together with the operating system. Optionally, the at least one application may be developed by a third party developer, such as an instant-messaging application, a picture-processing application or the like.

Figure 2:
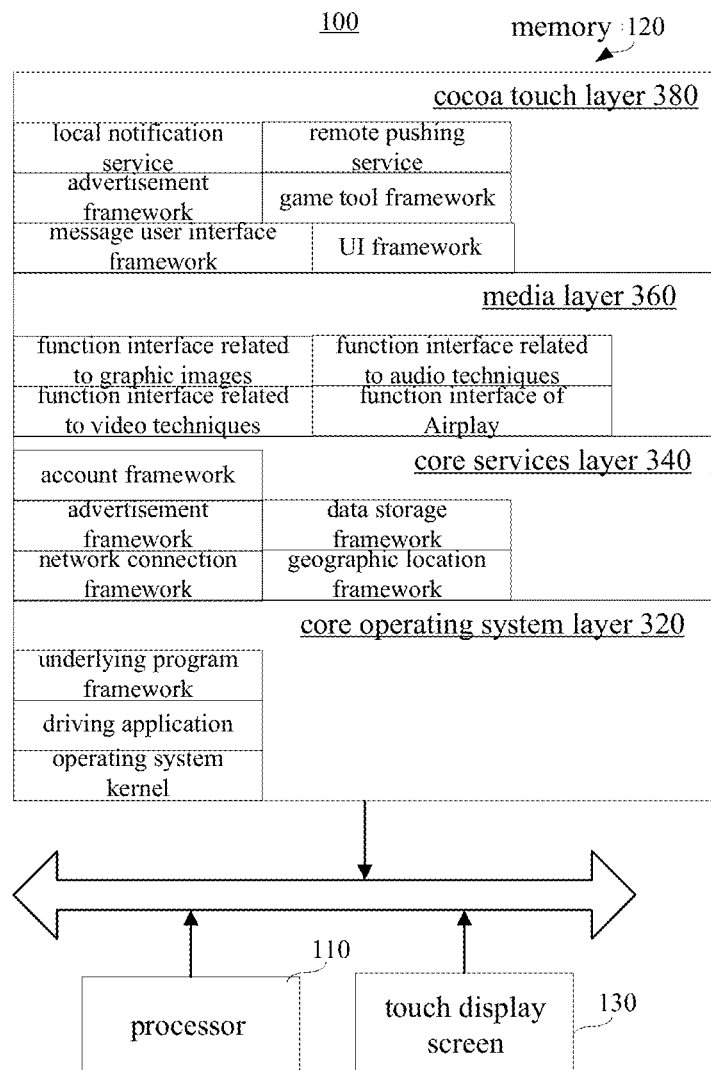
Figure 3A:
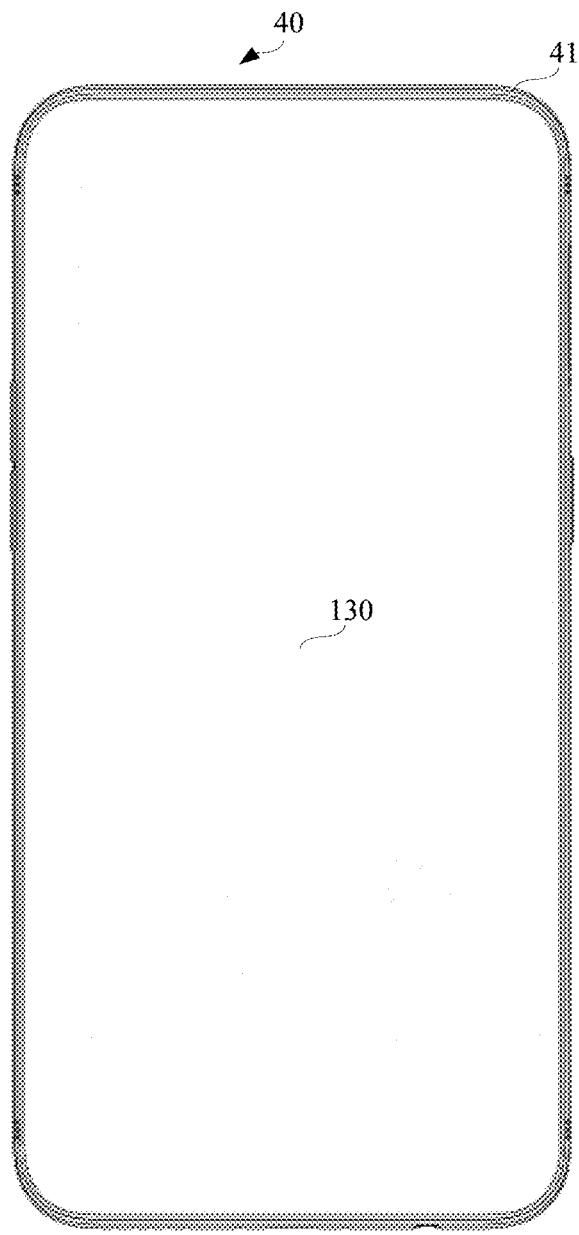
FIGS. 3A to 3F are schematic diagrams illustrating an appearance of a mobile terminal provided in an exemplary embodiment of the present disclosure.
Figure 3B:
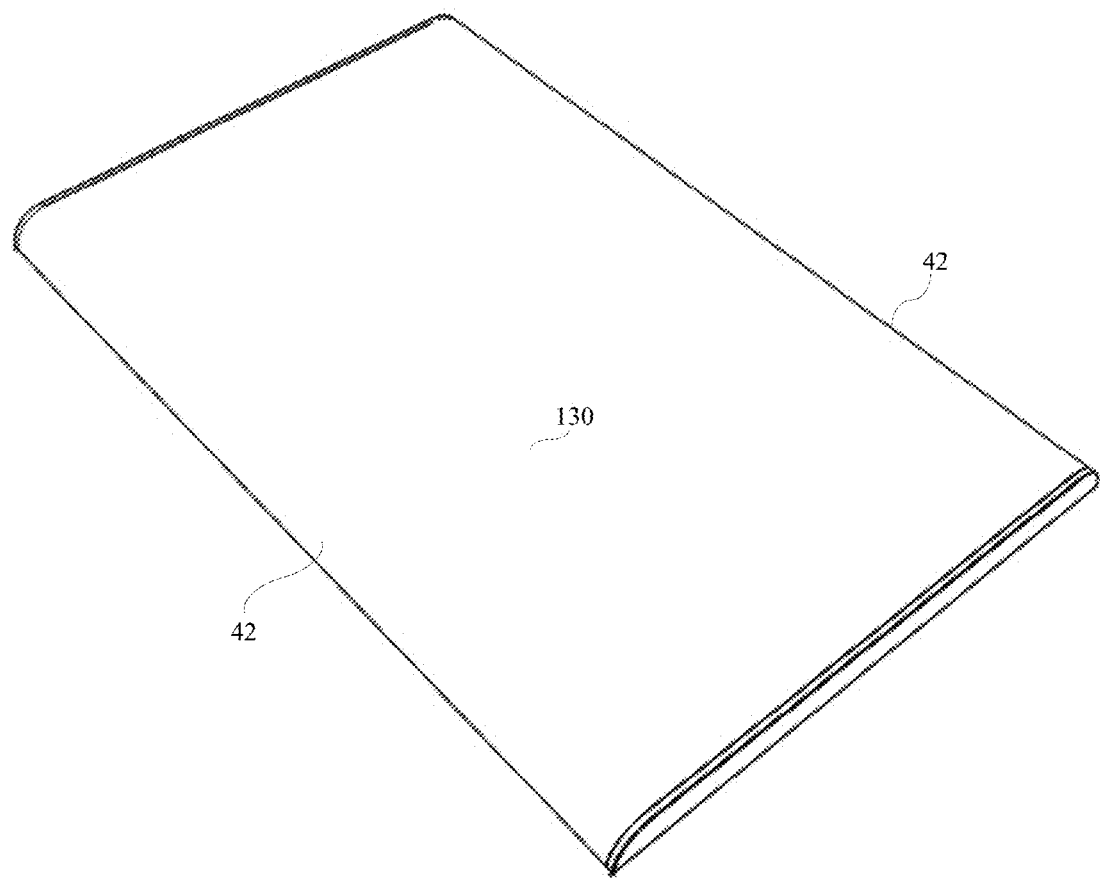
Figure 3C:
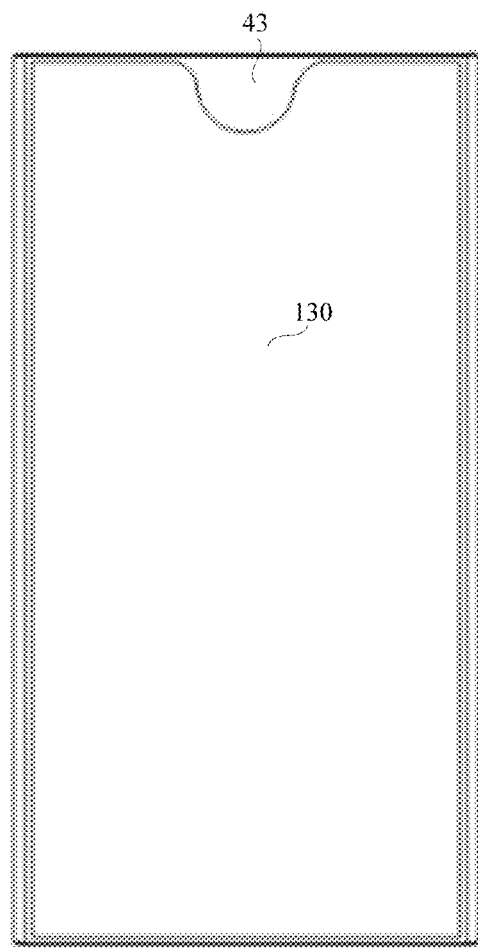
Figure 3D:
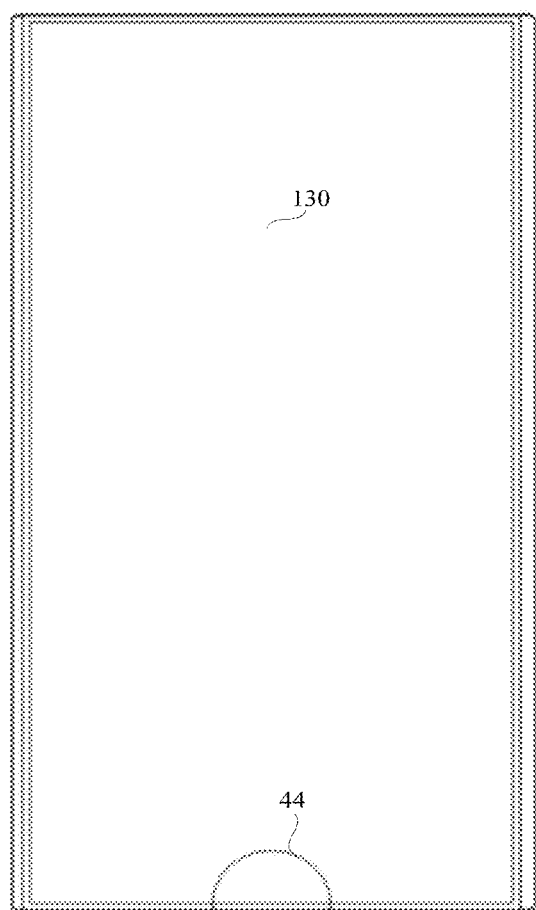
Figure 3E:
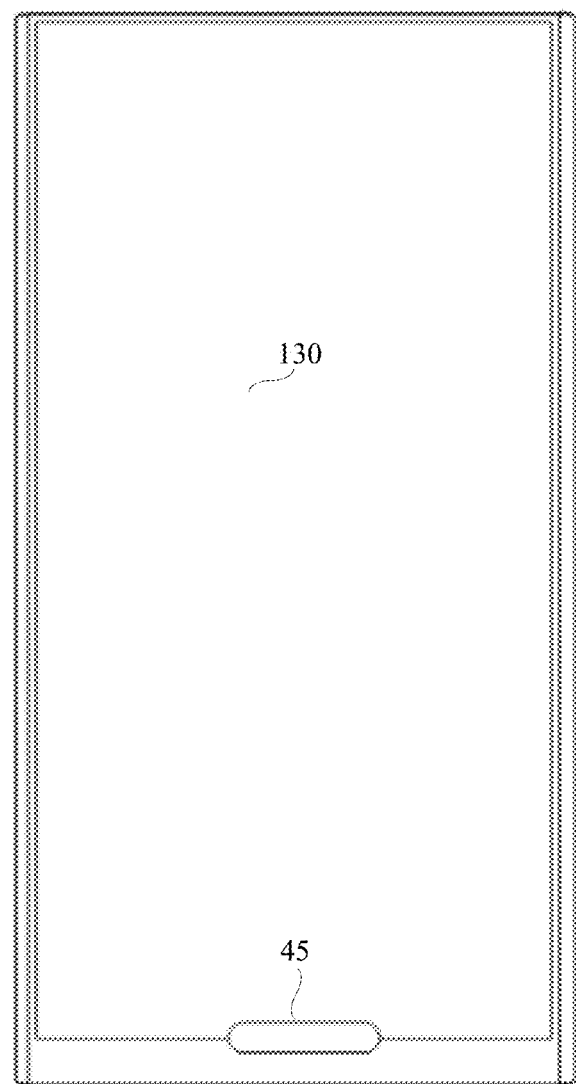
Figure 3F:
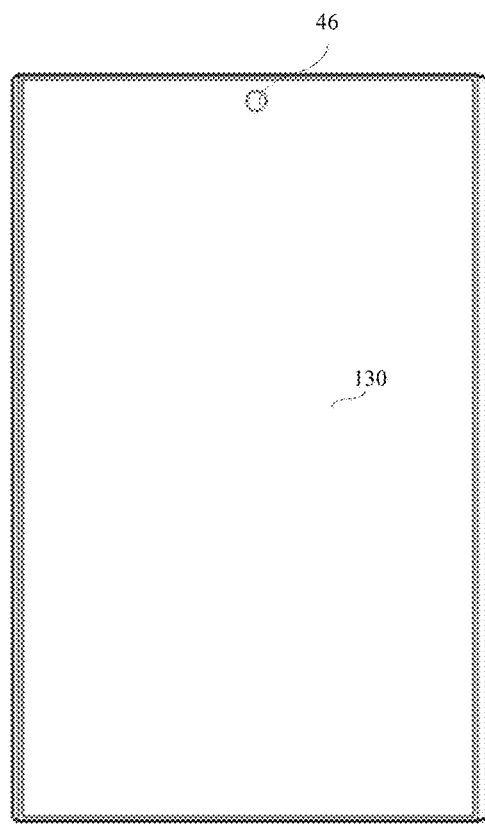

Taking IOS system to be the operating system as an example, the programs and the data stored in the memory 120 are illustrated as FIG. 2. The IOS system includes a core operating system layer 320, a core services layer 340, a media layer 360, and a cocoa touch layer 380. The core operating system layer 320 includes an operating system kernel, driving programs and underlying program frameworks. The underlying program frameworks are configured to provide functions more similar to hardware, to be provided for use by program frameworks of the core services layer 340. The core services layer 340 is configured to provide system services and/or program frameworks required by applications, such as foundation frameworks, account frameworks, advertisement frameworks, data storage frameworks, network connection frameworks, geographic location frameworks, movement frameworks and the like. The media layer 360 is configured to provide interfaces regarding to vision and hearing for applications, such as interfaces related to graphic images, interfaces related to audio techniques, interfaces related to video techniques, airplay interface related to audio-video transmission technique and the like. The cocoa touch layer 380 is configured to provide various frameworks related to commonly-used interfaces for application developments. The cocoa touch layer 380 serves to allow touch and interaction operations of users on the mobile terminal 100, such as local notification services, remote pushing services, advertisement frameworks, game tool frameworks, message user interface (UI) frameworks, user interface UIKit frameworks, map frameworks and the like.

In frameworks illustrated as FIG. 3, frameworks relevant to most applications include, but are not limited to, the foundation framework in the core services layer 340 and the UIKit framework in the cocoa touch layer 380. The foundation framework provides multiple basic object types and data types, provides the most basic system services for all applications, and is irrelevant to UI. The UIKit framework provides basic UI type library, for creating touch-based user interfaces. The IOS applications may provide UIs based on the UIKit framework. Therefore, the UIKit framework provides the basic architecture for the applications, for creating the user interfaces, drawing, processing interaction events with users, and responding to gestures.

The touch display screen 130 is configured to receive touch operations on or near the touch display screen applied by the user with fingers, stylus pens or other suitable items, and display the user interfaces of various applications. The touch display screen 130 is generally arrayed at a front panel of the mobile terminal 130. The touch display screen 130 may be designed as a full display screen, a curved surface screen or an irregular surface screen. The touch display screen 130 may also be designed as a combination of the full display screen and the curved surface screen, or a combination of the irregular surface screen and the curved surface screen, which is not limited in embodiments.

The term "full display screen" is described now.

The full display screen may refer to a kind of screen design where a screen ratio of the touch display screen 130 to the front panel of the mobile terminal 100 exceeds a threshold (such as 80%, 90% or 95%). One way to calculate the screen ratio is to divide an area of the front panel of the mobile terminal 100 by an area of the touch display screen 130 and multiply the division result by 100%. Another way to calculate the screen ration is to divide a length of a diagonal of the front panel of the mobile terminal 100 by a length of a diagonal of the touch display screen 130 and to multiply the division result by 100%. In an example illustrated as FIG. 3A, almost the front panel of the mobile terminal 100 is the touch display screen 130. On the front panel 40 of the mobile terminal 100, other regions than edges occupied by frames 41 are the touch display screen 130. Four corners of the touch display screen 130 may be right-angular corners or rounded corners.

The full display screen may also be in such design that at least one component of the front panel is integrated inside or under the touch display screen 130. Optionally, the at least one component of the front panel includes: a camera, a fingerprint sensor, a proximity optical sensor, a distance sensor, and the like. In some embodiments, other components on the front panel of a conventional mobile terminal are integrated in a whole region or a partial region of the touch display screen 130. For example, after the photosensitive element in the camera is divided into a several photosensitive pixels, each of the photosensitive pixels is integrated into a black region of each display pixel of the touch display screen 130. Since at least one component is integrated inside the touch display screen 130, the full display screen has a high screen ratio.

Certainly, in other embodiments, the components on the front panel of the conventional mobile terminal may also be arranged at the side or the back of the mobile terminal 100. For example, an ultrasonic fingerprint sensor is arranged under the touch display screen 130, a bone conductive earphone is arranged inside the mobile terminal 130, and a camera is arranged at the side of the mobile terminal and is pluggable.

In some optional embodiments, when the mobile terminal 100 is implemented as the full display screen, an edge touch sensor 120 is arranged at a single edge, at two edges (such as a left edge and a right edge), or at four edges (such as a top edge, a bottom edge, a left edge and a right edge) of middle frames of the mobile terminal 100. The edge touch sensor 120 is configured to detect at least one operation of a touch operation, a click operation, a press operation and a slide operation applied by the user on the middle frames. The edge touch sensor 120 may be any one of a touch sensor, a thermal sensor, a pressure sensor or the like. The user may apply an operation on the edge touch sensor 120, to control applications of the mobile terminal 100.

The term "curved surface screen" is described below.

The curved surface screen refers to a kind of screen design where screen regions of the touch display screen are not within a single plane. Generally, the curved surface screen has at least one section such that the section has a curved shape and a projection of the curved surface screen along any planar surface direction perpendicular to that section is planar. The curved shape may be U shaped. Optionally, the curved surface screen refers to a kind of screen design where at least one side has a curved shape. Optionally, the curved surface screen refers to that at least one side of the touch display screen 130 extends to overlap the middle frame of the mobile terminal 100. Since the side display region of the touch display screen 130 extends to overlap the middle frame of the mobile terminal 100, i.e., the middle frame originally having no display function and no touch control function is overlapped to define a display region and/or an operable region, the curved surface screen has a high screen ratio. Optionally, in an example illustrated as FIG. 3B, the curved surface screen refers to a kind of screen design where a left edge display region 42 and a right edge display region 42 have curved shape. Alternatively, the curved surface screen refers to a kind of screen design where a top edge display region and a bottom edge display region have the curved shape. Alternatively, the curved surface screen refers to a kind of screen design where the top edge display region, the bottom edge display region, the left edge display region and the right edge display region have the curved shape. In an optional embodiment, the curved surface screen is made of a touch screen material having certain flexibility.

The term "irregular surface screen" is described now.

The irregular surface screen refers to that an appearance of the touch display screen has an irregular shape. The irregular shape is not a rectangle or rounded rectangle. Optionally, the irregular surface screen refers to a kind of screen design where a protruding part, a breach and/or a hole is arranged on the rectangular or rounded rectangular touch display screen 130. Optionally, the protruding prat, the breach and/or the hole may be arranged at edges, at a center, or at edges and the center of the touch display screen 130. When being arranged at one edge, the protruding part, the breach and/or the hole may be disposed at center of that edge or at two ends of that edge. When being arranged at the center of the touch display screen, the protruding part, the breach and/or the hole may be disposed at one or more of a upper region, a upper-left region, a left region, a lower-left region, a lower region, a lower-right region, a right region, and an upper-right region. When being arranged at multiple regions, the protruding part, the breach and/or the hole may be centralized or distributed, or may be symmetric or asymmetric. Optionally, the amounts of the protruding parts, the breaches and/or the holes are not limited.

Since an upper forehead region and/or a lower forehead region of the touch display screen may be a displayable region and/or an operable region for the curved surface screen, the touch display screen occupies more spaces on the front panel of the mobile terminal. Therefore, the curved surface screen has a high screen ratio. In some embodiments, the breach and/or hole may be configured to accommodate at least one front panel component. The front panel component includes at least one of a camera, a fingerprint sensor, a proximity optical sensor, a distance sensor, an earphone, an ambient light luminance sensor, a physical key and the like.

Exemplarily, the breach may be arranged at one or more edges. The breach may be a semi-circular breach, a rectangular breach, a rounded rectangular breach or an irregular shaped breach. In an example illustrated as FIG. 3C, the irregular surface screen may be a kind of screen design where a semi-circular breach 43 is arranged at a central position of the top edge of the touch display screen 130. A region defined by the semi-circular breach 43 is configured to accommodate at least one front panel component of a camera, a distance sensor (also called as a proximity sensor), an earphone, and an ambient light luminance sensor. As exemplarily illustrated in FIG. 3D, the irregular surface screen may be a kind of screen design where a semi-circular breach 44 is arranged at a central position of the bottom edge of the touch display screen 130. A region defined by the semi-circular breach 44 is configured to accommodate at least one component of a physical key, a fingerprint sensor, and a microphone. In an example illustrated as FIG. 3E, the irregular surface screen may be a screen design where a semi-ellipse breach 45 is arranged at a central position of the bottom edge of the touch display screen 130 while another semi-ellipse breach is arranged at the front panel of the mobile terminal 100. The two semi-ellipse breaches define a whole ellipse region, which is configured to accommodate a physical key or a fingerprint identification component. In an example illustrated as FIG. 3F, the irregular surface screen may be a kind of screen design where at least one hole 45 is arranged within an upper half of the touch display screen 130. At least one region defined by the at least one hole 45 is configured to accommodate at least one front panel component of a camera, a distance sensor, an earphone, and an ambient light luminance sensor.

In addition, those skilled in the art should understand that, the structures of the mobile terminal 100 illustrated in above drawings are not used to limit the mobile terminal. The mobile terminal may include more or less components than those illustrated in drawings, or may combine some component or may have different component arrangements. For example, the mobile terminal 100 may also include a radio frequency circuit, an input unit, a sensor, an audio circuit, a wireless fidelity (WiFi) module, a power supply, a Bluetooth module and the like, which are not elaborated herein.

Below, several terms used in the present disclosure will be described.

A click typed touch operation refers to a touch operation having an unchanged touch position on the touch display screen within a first touch duration. The first touch duration is generally short, such as 500 milliseconds (ms).

Optionally, the click typed touch operation may be a single click operation, a double click operation and the like.

Figure 4:
FIG. 4 is a schematic diagram illustrating a relationship between touch positions and displacements provided in an embodiment of the present disclosure.

Referring to a relationship between time and displacement for the click typed touch operation illustrated as FIG. 4, it can be seen from FIG. 4 that, within 500 ms, the touch position of the touch operation is unchanged, and the displacement is 0 (indicated by the overstriking line in FIG. 4).

Optionally, in embodiments, a relatively short displacement may occur during a first sub-duration of the first touch duration, and the displacement may be unchanged during a second sub-duration of the first touch duration, for the click typed touch operation. A ratio of the first sub-duration to the first touch duration is less than a first ratio. That is, the click typed touch operation is a click-focused touch operation.

Optionally, the first ratio is greater than 0 and less than 1, such as 0.5, 0.3, or 0.1. The value of the first ratio is not limited in embodiments.

A slide typed touch operation refers to a touch operation having changed touch positions on the touch display screen within a second touch duration. The second touch duration is greater than the first touch duration, such as 1 second (s).

Figure 5:
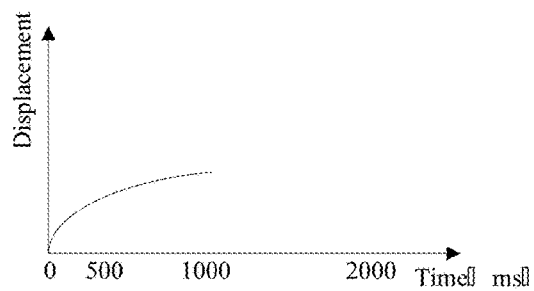
FIG. 5 is a schematic diagram illustrating a relationship between touch positions and displacements provided in an embodiment of the present disclosure.

Referring to a relationship between time and touch position of the touch operation for the slide typed touch operation illustrated as FIG. 5, it can be seen from FIG. 5 that, within 1 s, the touch position of the touch operation is unchanged, while the displacement is changed.

Optionally, in embodiment, the displacement may be changed during a third sub-duration of the second touch duration, and the displacement is unchanged during a fourth sub-duration of the second touch duration, for the slide typed touch operation. A ratio of the fourth sub-duration to the second touch duration is less than a second ratio. That is, the slide typed touch operation is a slide-focused touch operation.

Optionally, the second ratio is greater than 0 and less than 1, such as 0.5, 0.3, or 0.1. The second ratio may be equal to the first ratio, or different from the first ratio. The value of the second ratio is not limited in embodiments.

A long press typed touch operation refers to a touch operation having an unchanged touch position on the touch display screen during a third touch duration. The third touch duration is longer than the first touch duration, such as 2 s.

Figure 6:
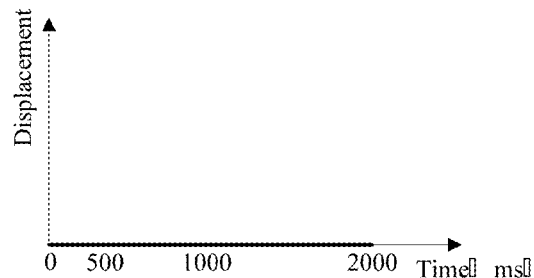
FIG. 6 is a schematic diagram illustrating a relationship between touch positions and displacements provided in an embodiment of the present disclosure.

Referring to a relationship between time and touch position of the touch operation for the long press typed touch operation illustrated as FIG. 6, it can be seen from FIG. 6 that, within 2 s, the touch position of the touch operation is unchanged, while the displacement is 0.

Optionally, in embodiments, the displacement may be changed during a fifth sub-duration of the third touch duration, and the displacement may be unchanged during a sixth sub-duration of the third touch duration for the long press typed touch operation. A ratio of the fifth sub-duration to the third touch duration is less than a third ratio. That is, the long press typed touch operation is a long-press-focused touch operation.

Optionally, the third ratio is greater than 0 and less than 1, such as 0.5, 0.3 or 0.1. The third touch duration may be equal to the first touch duration, or different from the first touch duration. A value of the third ratio is not limited in embodiments.

An operation region refers to a region of the touch display screen supporting to respond to the touch operation received. Optionally, the whole touch display screen of the mobile terminal is the operation region.

Optionally, when frames of the touch display screen are narrow, during a usage process by the user, the user's palm and/or fingers may accidentally touch the edge regions of the touch display screen, causing accidental operations. Based on the above technical problem, the present disclosure provide following technical solutions to recognize the accidental operations of the user, thereby saving resources of the mobile terminal.

Optionally, the mobile terminal is taken as a main execution body in each embodiment of the present disclosure for illustrating. The touch display screen of the mobile terminal may be any one of the above full display screen, a curved surface screen and an irregular surface screen. Optionally, the touch display screen of the mobile terminal may be of other types. Optionally, widths of frames of the touch display screen are less than a predetermined threshold. For example, the widths of the frames of the curved surface screen are 0.

For the mobile terminal with narrow frames, when a user holds the mobile terminal, a position where the user grips the mobile terminal may be within a touch portion of the touch display screen, thereby causing the mobile terminal to judge by error since the user accidentally touches an edge region of the touch display screen. The edge region of the touch display screen refers to an upper edge region, a left edge region, a lower edge region, and a right edge region of the touch display screen.

At present, the mobile terminal is unable to determine whether an operation on the edge regions of the touch display screen is an accidental operation. If the mobile terminal directly responds to the operation, it is likely that the mobile terminal may perform an undesired task, wasting resources of the mobile terminal.

Embodiments of the present disclosure provide a method for responding to a touch operation, applicable to a mobile terminal comprising a touch display screen. The method includes determining a usage scenario of the mobile terminal; receiving a first touch operation applied on the touch display screen and a second touch operation applied on the touch display screen within a predetermined duration; determining a first operation type of the first touch operation; determining a second operation type of the second touch operation; and determining whether to respond to the first touch operation and/or the second touch operation based on the first operation type, the second operation type and the usage scenario.

In an embodiment, determining whether to respond to the first touch operation and/or the second touch operation based on the first operation type, the second operation type and the usage scenario includes determining a response priority of the first operation type and a response priority of the second operation type based on the usage scenario; and determining whether to respond to the first touch operation and/or the second touch operation based on the response priority of the first operation type and the response priority of the second operation type.

In an embodiment, the first operation type is one of a click type, a slide type and a long press type; the second operation type is one of the click type, the slide type and the long press type. Determining the response priority of the first operation type and the response priority of the second operation type based on the usage scenario includes when the usage scenario is a first predetermined scenario, determining that the response priority of the click type is higher than the response priority of the slide type, and the response priority of the slide type is higher than the response priority of the long press type; or when the usage scenario is a second predetermined scenario, determining that the response priority of the click type is higher than the response priority of the long press type, and the response priority of the long press type is higher than the response priority of the slide type; or when the usage scenario is a third predetermined scenario, determining that the response priority of the slide type is higher than the response priority of the click type, and the response priority of the click type is higher than the response priority of the long press type.

In an embodiment, determining whether to respond to the first touch operation and/or the second touch operation based on the response priority of the first operation type and the response priority of the second operation type includes responding to the first touch operation and not responding to the second touch operation, or responding to the first touch operation and responding to the second touch operation after responding to the first touch operation, when the response priority of the first operation type is higher than the response priority of the second operation type.

In an embodiment, determining the usage scenario of the mobile terminal includes determining the usage scenario based on an application running in foreground of the mobile terminal.

Embodiments of the present disclosure provide a device for responding to a touch operation, applied in a mobile terminal comprising a touch display screen. The device includes: a scenario determining unit, configured to determine a usage scenario of the mobile terminal; an operation receiving unit, configured to receive a first touch operation applied on the touch display screen and a second touch operation applied on the touch display screen within a predetermined duration; a type determining unit, configured to determine a first operation type of the first touch operation and determine a second operation type of the second touch operation; and an operation responding unit, configured to determine whether to respond to the first touch operation and/or the second touch operation based on the first operation type, the second operation type and the usage scenario.

In an embodiment, the operation responding unit is configured to determine a response priority of the first operation type and a response priority of the second operation type according to the usage scenario; and determine whether to respond to the first touch operation and/or the second touch operation based on the response priority of the first operation type and the response priority of the second operation type.

In an embodiment, the first operation type is one of a click type, a slide type and a long press type, and the second operation type is one of the click type, the slide type and the long press type. The operation responding unit is configured to: when the usage scenario is a first predetermined scenario, determine that the response priority of the click type is higher than the response priority of the slide type, and the response priority of the slide type is higher than the response priority of the long press type; or when the usage scenario is a second predetermined scenario, determine that the response priority of the click type is higher than the response priority of the long press type, and the response priority of the long press type is higher than the response priority of the slide type; or when the usage scenario is a third predetermined scenario, determine that the response priority of the slide type is higher than the response priority of the click type, and the response priority of the click type is higher than the response priority of the long press type.

In an embodiment, the operation responding unit is configured to respond to the first touch operation and not respond to the second touch operation, or respond to the first touch operation and respond to the second touch operation after responding to the first touch operation, when the response priority of the first operation type is higher than the response priority of the second operation type.

In an embodiment, the scenario determining unit is configured to determine the usage scenario based on an application running in foreground of the mobile terminal.

Embodiments of the present disclosure provide a method for responding to a touch operation, applicable to a mobile terminal comprising a touch display screen. The method includes receiving a first touch operation applied on the touch display screen and a second touch operation applied on the touch display screen within a predetermined duration; determining a first operation type of the first touch operation; determining a second operation type of the second touch operation; and determining whether to respond to the first touch operation and/or the second touch operation based on the first operation type and the second operation type.

In an embodiment, a response priority of the first operation type is higher than the response priority of the second operation type.

In an embodiment, determining whether to respond to the first touch operation and/or the second touch operation based on the first operation type and the second operation type includes responding to the first operation type and not responding to the second operation type.

In an embodiment, determining whether to respond to the first touch operation and/or the second touch operation based on the first operation type and the second operation type includes responding to the first operation type and responding to the second operation type after responding to the first operation type.

In an embodiment, the first operation type is one of a click type, a slide type and a long press type; the second operation type is one of the click type, the slide type and the long press type.

In an embodiment, whether to respond to the first touch operation and/or the second touch operation based on the first operation type and the second operation type includes when both the first operation type and the second operation type are the long press type, not responding to the first operation type or the second operation type.

Embodiments of the present disclosure provide a device for responding to a touch operation, applied in a mobile terminal comprising a touch display screen. The device includes an operation receiving unit, configured to receive a first touch operation applied on the touch display screen and a second touch operation applied on the touch display screen within a predetermined duration; a type determining unit, configured to determine a first operation type of the first touch operation and determine a second operation type of the second touch operation; and an operation responding unit, configured to determine whether to respond to the first touch operation and/or the second touch operation based on the first operation type and the second operation type.

In an embodiment, a response priority of the first operation type is higher than the response priority of the second operation type.

In an embodiment, the operation responding unit is configured to respond to the first operation type and not respond to the second operation type.

In an embodiment, the operation responding unit is configured to respond to the first operation type and respond to the second operation type after responding to the first operation type.

In an embodiment, the first operation type is one of a click type, a slide type and a long press type; the second operation type is one of the click type, the slide type and the long press type.

In an embodiment, the operation responding unit is configured to, when both the first operation type and the second operation type are the long press type, not respond to the first operation type or the second operation type.

Embodiments of the present disclosure provide a method for responding to a touch operation, applicable to a mobile terminal comprising a touch display screen. The method includes determining a first operation region of the touch display screen and a second operation region of the touch display screen; receiving a touch operation applied on the touch display screen; determining an operation region on which the touch operation is applied, the operation region being one of the first operation region and the second operation region; determining an operation type of the touch operation; and determining whether to respond to the touch operation according to the operation region on which the touch operation is applied and the operation type.

In an embodiment, determining the first operation region of the touch display screen and the second operation region of the touch display screen includes: determining a holding manner of the mobile terminal, and determining the first operation region of the touch display screen and the second operation region of the touch display screen based on the holding manner. The holding manner includes one of a left hand holding manner, a right hand holding manner and a both hand holding manner.

In an embodiment, determining the first operation region of the touch display screen and the second operation region of the touch display screen includes: determining a display mode of the mobile terminal, and determining the first operation region of the touch display screen and the second operation region of the touch display screen based on the display mode. The display mode includes a landscape display mode and a portrait display mode.

In an embodiment, determining the first operation region of the touch display screen and the second operation region of the touch display screen includes: determining a usage scenario of the mobile terminal, and determining the first operation region of the touch display screen and the second operation region of the touch display screen based on the usage scenario. The usage scenario includes an application currently running on the mobile terminal.

In an embodiment, a response priority of a touch operation applied on the first operation region is higher than a response priority of a touch operation applied on the second operation region.

In an embodiment, when the touch operation includes one touch operation, determining whether to respond to the touch operation according to the operation region on which the touch operation is applied and the operation type includes when the one touch operation is applied on the first operation region, respond to the one touch operation when an operation type of the one touch operation is one of a click type, a slide type and a long press type; when the one touch operation is applied on the second operation region, respond to the one touch operation when the operation type of the one touch operation is one of the click type and the slide type; and when the one touch operation is applied on the second operation region, not respond to the one touch operation when the operation type of the one touch operation is the long press type.

In an embodiment, when the touch operation includes a first touch operation and a second touch operation, determining whether to respond to the touch operation according to the operation region on which the touch operation is applied and the operation type includes responding to the first touch operation and not responding to the second touch operation when the first touch operation is applied on the first operation region and the second touch operation is applied on the second operation region, or responding to the first touch operation and responding to the second touch operation after responding to the first touch operation when the first touch operation is applied on the first operation region and the second touch operation is applied on the second operation region.

In an embodiment, when the touch operation includes a first touch operation and a second touch operation, the method further includes determining a first operation type of the first touch operation and a second operation type of the second touch operation when the first touch operation and the second touch operation are applied on one of the first operation region and the second operation region; determining a response priority of the first operation type and a response priority of the second operation type; and determining whether to respond to the first touch operation and/or the second touch operation based on the response priority of the first operation type and the response priority of the second operation type.

In an embodiment, the method further includes responding to the first touch operation and not responding to the second touch operation when the response priority of the first operation type is higher than the response priority of the second operation type, or responding to the first touch operation and responding to the second touch operation after responding to the first touch operation, when the response priority of the first operation type is higher than the response priority of the second operation type.

In an embodiment, the first operation type is a click type, and the second operation type is one of a slide type and a long press type; or the first operation type is the slide type, and the second operation type is the long press type.

In an embodiment, the response priority of the click type is higher than the response priority of the slide type, and the response priority of the slide type is higher than the response priority of the long press type.

Embodiments of the present disclosure provide a device for responding to a touch operation, applied in a mobile terminal comprising a touch display screen. The device includes: a region dividing unit, configured to determine a first operation region of the touch display screen and a second operation region of the touch display screen; an operation receiving unit, configured to receive a touch operation applied on the touch display screen; a region determining unit, configured to determine an operation region on which the touch operation is applied, the operation region being one of the first operation region and the second operation region; a type determining unit, configured to determine an operation type of the touch operation; and an operation responding unit, configured to determine whether to respond to the touch operation according to the operation region on which the touch operation is applied and the operation type.

In an embodiment, the region dividing unit is configured to determine a holding manner of the mobile terminal, and determine the first operation region of the touch display screen and the second operation region of the touch display screen based on the holding manner. The holding manner includes one of a left hand holding manner, a right hand holding manner and a both hand holding manner.

In an embodiment, the region dividing unit is configured to determine a display mode of the mobile terminal, and determine the first operation region of the touch display screen and the second operation region of the touch display screen based on the display mode. The display mode includes a landscape display mode and a portrait display mode.

In an embodiment, the region dividing unit is configured to determine a usage scenario of the mobile terminal, and determine the first operation region of the touch display screen and the second operation region of the touch display screen based on the usage scenario. The usage scenario includes an application currently running in the mobile terminal.

In an embodiment, a response priority of a touch operation applied on the first operation region is higher than a response priority of a touch operation applied on the second operation region. The operation type includes a click type, a long press type and a slide type. The response priority of the click type is higher than the response priority of the slide type, and the response priority of the slide type is higher than the response priority of the long press type.

Embodiments of the present disclosure provide an electronic device. The electronic device includes a processor, a memory coupled to the processor, program instructions stored in the memory and a touch display screen. When the program instructions are executed by the processor, the above method for responding to a touch operation according to any one of embodiments is implemented.

Embodiments of the present disclosure provide a non-transitory computer readable storage medium, having program instructions stored thereon. When the program instructions are executed by a processor, the above method for responding to a touch operation according to any one of embodiments is implemented.

Embodiments of the present disclosure provide a computer program product having computer programs. When the computer program is executed by a processor, the above method for responding to a touch operation according to any one of embodiments is implemented.

Beneficial effects of the above technical solutions provided in embodiments of the present disclosure include the followings. When at least two touch operations are received by the mobile terminal, it is determined whether to respond to the touch operations based on the operation type of each of the touch operations. A problem of wasting running resources of the mobile terminal due to a direct response of the mobile terminal to the touch operation when the touch operation is received and the touch operation is an accidental operation may be solved. Since the mobile terminal may determine whether to respond to the touch operation based on a decision whether the operation type has a high probability of occurrence of the accidental operation, a probability of responses of the mobile terminal to the accidental operation is reduced.

In addition, by determining the response priorities of the operation types based on the usage scenario, the mobile terminal may flexibly switch among the response priorities of the operation types based on the usage scenario, reducing the probability of response of the mobile terminal to the accidental operation.

Figure 7:
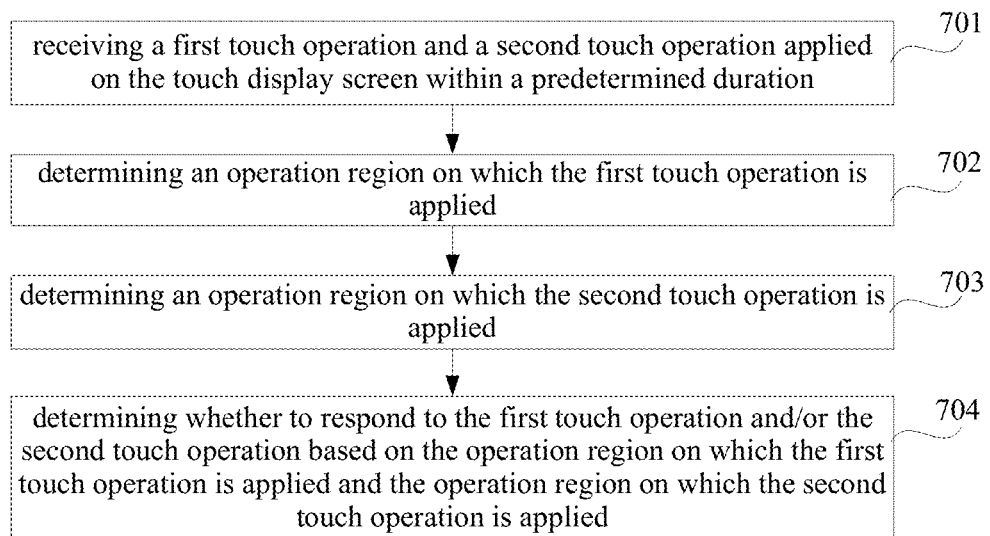
FIG. 7 is a flow chart illustrating a method for responding to a touch operation provided in an embodiment of the present disclosure.

FIG. 7 is a flow chart illustrating a method for responding to a touch operation provided in an exemplary embodiment of the present disclosure. The method for responding to a touch operation includes the followings.

In block 701, a first touch operation applied on a touch display screen and a second touch operation applied on the touch display screen within a predetermined duration are received.

Optionally, a touch sensor is arranged inside the touch display screen of the mobile terminal. The touch sensor is configured to detect in real time or at time intervals whether a touch operation exists. When it is detected by the touch sensor that the touch operation exists, a touch event corresponding to the touch operation is sent to a processor. The processor is configured to identify an operation type and/or a touch position of the touch operation based on the touch event.

Optionally, the operation type of the touch operation may be at least one of a click type, a slide type, and a long press type.

The predetermined duration is generally short, such as 100 ms. That is, it may be considered that the first touch operation and the second touch operation are received by the mobile terminal at a same time.

Optionally, in embodiments, the first touch operation and the second touch operation are used to indicate different touch operations, and not indicate an amount and/or a receiving order of the touch operations. For example, when the mobile terminal receives 3 touch operations on the touch display screen, a first one of the three touch operations is determined as the first touch operation, while a second one or a third one of the three touch operations is determined as the second touch operation.

In block 702, an operation region on which the first touch operation is applied is determined.

The touch display screen includes a first operation region and a second operation region. The operation region on which the first touch operation is applied is one of the first operation region and the second operation region.

Optionally, in the present disclosure, determining the operation region on which the touch operation (including the first touch operation and the second touch operation) is applied by the mobile terminal includes the followings. It is detected whether a touch position of the touch operation is within a positional range corresponding to the first operation region. When the touch position of the touch operation is within the positional range corresponding to the first operation region, it is determined that the operation region on which the touch operation is applied is the first operation region. When it is determined that the touch position of the touch operation is not within the positional range corresponding to the first operation region, it is determined that the operation region on which the touch operation is applied is the second operation region.

Optionally, the mobile terminal may also be configured to detect whether the touch position of the touch operation is within a positional range corresponding to the second operation region. When the touch position of the touch operation is within the positional range corresponding to the second operation region, it is determined that the operation region on which the touch operation is applied is the second operation region. When the touch position of the touch operation is not within the positional range corresponding to the second operation region, it is determined that the operation region on which the touch operation is applied is the first operation region.

Optionally, the positional range corresponding to the first operation region is a coordinate set consisted of at least one coordinate. Exemplarily, the positional range corresponding to the first operation range is {(100, 100), (1500, 1500)}, indicating a region from the coordinate (100, 100) to the coordinate (1500, 1500) is the first operation region.

Optionally, the positional range corresponding to the second operation region is determined based on the positional range corresponding to the first operation region. That is, the positional range corresponding to the second operation region corresponds to an operation region excluding the first operation region.

Optionally, the coordinate of each position is determined according to a position of each pixel point. For example, a position defined by the coordinate (100, 100) denotes the pixel point at an intersection of $100^{th}$ row and $100^{th}$ column.

Referring to FIG. 8, the touch display screen is divided into the first operation region 81 and the second operation region 82. The positional range corresponding to the first operation region 81 is {(100, 100), (1500, 1500)}, and the positional range corresponding to the second operation region corresponds to an operation region of the touch display screen other than the first operation region 81. When two touch operations are applied on the touch display screen, and the touch position of a first one of the two touch operations is at (900, 900) which is within the positional range corresponding to the first operation region 81, while a second one of the two touch operations is at (20, 20) which is not within the positional range corresponding to the first operation region 81, it is determined that the operation region on which the first one of the two touch operations is applied is the first operation region, while the operation region on which the second one of the two touch operations is the second operation region.

Optionally, denoting the touch position of the touch operation as a coordinate is merely an example for illustrating in embodiments. In practical implementations, the touch position of the touch operation may be denoted as a set of coordinates. The mobile terminal may calculate an average value along x axis and an average value along y axis according to the set of coordinates, to obtain an average coordinate. The operation region on which the touch operation is applied is determined based on the average coordinate.

For example, the touch position of the touch operation is {(900, 900), (900, 901), (900, 902), (901, 900), (901, 901), (901, 902), (902, 900), (902, 901), (902, 902)}. The average value along the x axis is (900+900+900+901+901+901+902+902+902)/9=901, while the average value along the y axis is (900+900+900+901+901+901+902+902+902)/9=901. The average coordinate is (901, 901), which is within the positional range corresponding to the first operation region. Therefore, it is determined that the operation region on which the touch operation is applied is the first operation region.

Optionally, when the position of the touch operation is denoted by a set of coordinates, and when all of coordinates included in the set or a number of coordinates (exceeding a predetermined ratio) included in the set are within a same operation region, it is determined that the region on which the touch operation is applied is that operation region.

In block 703, an operation region on which the second touch operation is applied is determined.

The operation region on which the second touch operation is applied is one of the first operation region and the second operation region.

Relevant descriptions to this block are referred to the block 702, which are not elaborated herein.

In block 704, it is determined whether to respond to the first touch operation and/or the second touch operation based on the operation region on which the first touch operation is applied and based on the operation region on which the second touch operation is applied.

Optionally, a response rule corresponding to operation regions is set in the mobile terminal. The response rule is configured to indicate whether to respond to the touch operations applied on the first operation region and on the second operation region. The mobile terminal is configured to determine whether to respond to the first touch operation and/or the second touch operation based on the response rule corresponding to the operation region on which the first touch operation is applied and the operation region on which the second touch operation is applied.

Referring to FIG. 9 which illustrates the response rule corresponding to the operation regions, when the first touch operation is applied on the first operation region and the second touch operation is applied on the second operation region, the mobile terminal is configured to respond to the first touch operation and not respond to the second touch operation.

Optionally, a response priority corresponding to the operation region is pre-set in the mobile terminal. The response priority of the touch operation applied on the first operation region is higher than the response priority of the touch operation applied on the second operation region. The mobile terminal is configured to determine whether to respond to the first touch operation and/or the second touch operation based on the response priority of the first operation region on which the first touch operation is applied and the response priority of the operation region on which the second touch operation is applied.

Schematically, the operation region of the first touch operation is the first operation region, while the operation region of the second touch operation is the second operation region. Since the response priority corresponding to the first operation region is higher than the response priority corresponding to the second operation region, the mobile terminal is configured to respond to the first touch operation and not respond to the second touch operation, or respond to the first touch operation, and respond to the second touch operation after responding to the first touch operation.

The response priority corresponding to the first operation region refers to a response priority of a touch operation applied on the first operation region. The response priority corresponding to the second operation region refers to a response priority of a touch operation applied on the second operation region.

In conclusion, with the method for responding to a touch operation provided in embodiments, when at least two touch operations are received by the mobile terminal, it is determined whether to respond to the touch operations based on the operation region on which each of the touch operations is applied. A problem of wasting running resources of the mobile terminal due to a direct response of the mobile terminal to the touch operation when the touch operation is received and the touch operation is an accidental operation may be solved. Since the mobile terminal may determine whether to respond to the touch operation based on a decision whether the operation region has a high probability of occurrence of the accidental operation, a probability of responses of the mobile terminal to the accidental operation is reduced.

Optionally, in the present disclosure, responding to the touch operation (including the first touch operation and/or the second touch operation) by the mobile terminal refers to executing a task indicated by the touch operation. For example, when the touch operation is a click operation on an icon of an application on a desktop, responding to the touch operation by the mobile terminal refers to running application in foreground. For example, when the touch operation is a long press operation applied on an audio input option, responding to the touch operation by the mobile terminal refers to activating an audio recording function. For example, when the touch operation is a slide operation applied on a contact display page, responding to the touch operation by the mobile terminal refers to rolling the contact display page to display more contacts based on a slide distance and a slide direction of the slide operation. Certainly, when responding to the touch operation, the mobile terminal may execute other tasks which are not listed in embodiments.

Optionally, in above embodiments, since edge regions of the touch display screen generally have a high probability of occurrence of the accidental operations, the second operation region is at the edge regions of the touch display screen. The touch display screen includes four edge regions, such as a top edge region, a bottom edge region, a left edge region and a right edge region. The second operation region includes at least one of the four edge regions. The first operation region is the region of the touch display region other than the second operation region.

Referring to FIG. 8, the second operation region 82 includes four edge regions, and the first operation region 81 is the region of the touch display screen other than the second operation region 82.

Optionally, the first operation region may be rectangular, rounded-rectangular, circular, ellipse, irregular or the like. A shape of the second operation region is accordingly determined based on the shape of the first operation region.

Figure 10:
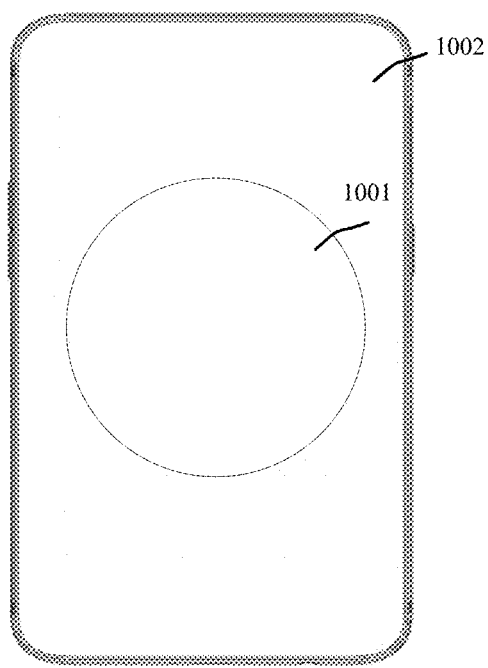
FIG. 10 is a schematic diagram illustrating a first operation region and a second operation region provided in an embodiment of the present disclosure.

Referring to FIG. 10, the first operation region 1001 is circular, and the region of the touch display screen other than the first operation region 1001 is the second operation region 1002.

Optionally, the shape of the first operation region and/or the shape of the second operation region is set by default by the mobile terminal or is selected by a user, which is not limited herein.

Optionally, a size of the first operation region and/or a size of the second operation region is set by default by the mobile terminal, or is selected by a user, which is not limited herein.

In embodiments, by determining an edge region having a high probability of occurrence of the accidental operations as the second operation region, and by determining the region other than the second operation region as the first operation region, the mobile terminal may preferentially respond to the touch operation applied on the first operation region when receiving the touch operation applied on the first operation region and the touch operation applied on the second operation region, since the response priority corresponding to the first operation region is higher than the response priority corresponding to the second operation region, thereby reducing a probability of preferential response of the mobile terminal to the accidental operations.

Optionally, as usage ways of the mobile terminal are different, regions of the touch display screen on which accidental touch operations are applied are different. For example, when the mobile terminal is hold via a right hand by the user, a probability that a right edge region of the touch display screen is accidentally touched is high. When the first operation region and the second operation region are location-unchanged and/or size-fixed on the touch display region, and the second operation region includes less of the right edge region, or even excludes the right edge region, it is still likely that the mobile terminal responds to the accidental operations. In order to reduce the probability of responses of the mobile terminal to the accidental operations, in the present disclosure, the mobile terminal may be further configured to determine in advance the first operation region and the second operation region based on a current usage situation.

Optionally, the usage situation of the mobile terminal includes, but is not limited to, at least one of a hold manner of the mobile terminal, a display mode of the mobile terminal and a usage scenario of the mobile terminal.

The hold manner of the mobile terminal refers to a manner of holding the mobile terminal by the user, including a right hand holding manner, a left hand holding manner, a both hand holding manner.

The display mode of the mobile terminal includes a landscape display mode and a portrait display mode.

Figure 11:
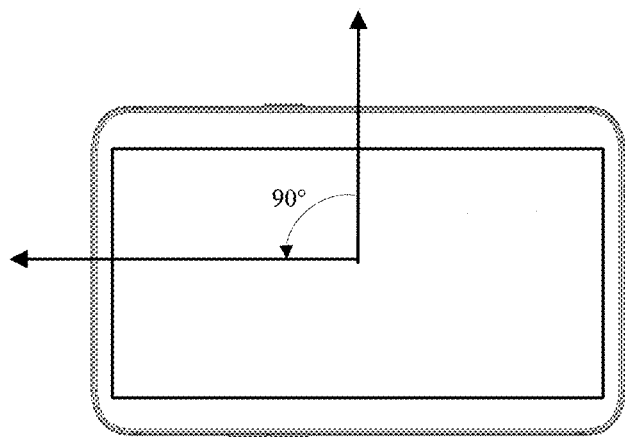
FIG. 11 is a schematic diagram illustrating a display mode provided in an embodiment of the present disclosure.
Figure 12:
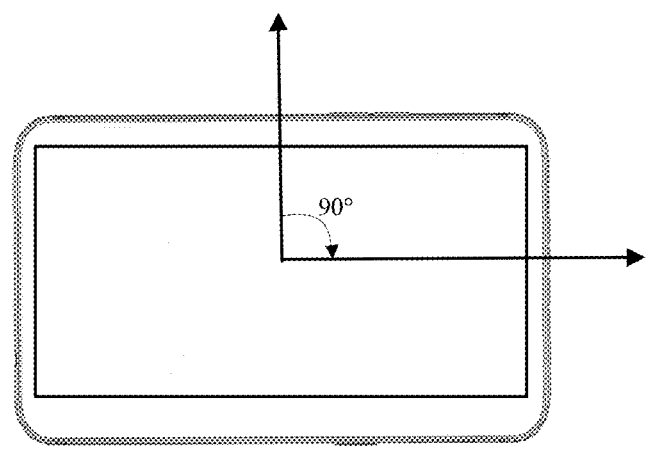
FIG. 12 is a schematic diagram illustrating a display mode provided in an embodiment of the present disclosure.

The landscape display mode refers to that a display interface of the mobile terminal is rotated around a center point to left or to right by 90 degrees. Optionally, in the present disclosure, a display mode that the display interface is rotated around the center point to left by 90 degrees is called as a positive landscape display mode. Referring to FIG. 11, the display interface is rotated around the center point to left by 90 degrees. A display mode that the display interface is rotated around the center point to right by 90 degrees is called as a negative landscape display mode. Referring to FIG. 12, the display interface is rotated around the center point to right by 90 degrees.

Optionally, calling the display mode that the display interface is rotated around the center point to left by 90 degrees as the negative landscape display mode and calling the display mode that the display interface is rotated around the center point to right by 90 degrees as the negative landscape display mode are taken as an example in embodiments for illustrating. In practical implementations, the display mode that the display interface is rotated around the center point to left by 90 degrees may be realized as the negative landscape display mode, while the display mode that the display interface is rotated around the center point to right by 90 degrees may be realized as the positive landscape display mode, which are not limited in the present disclosure.

Figure 13:
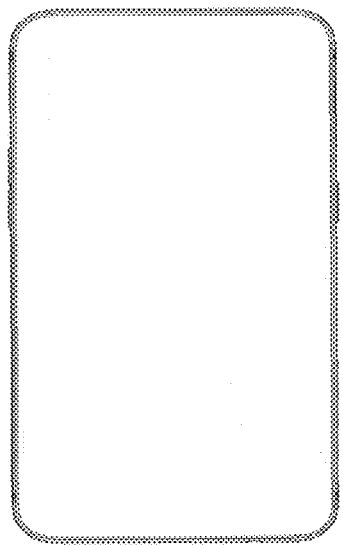
FIG. 13 is a schematic diagram illustrating a display mode provided in an embodiment of the present disclosure.
Figure 14:
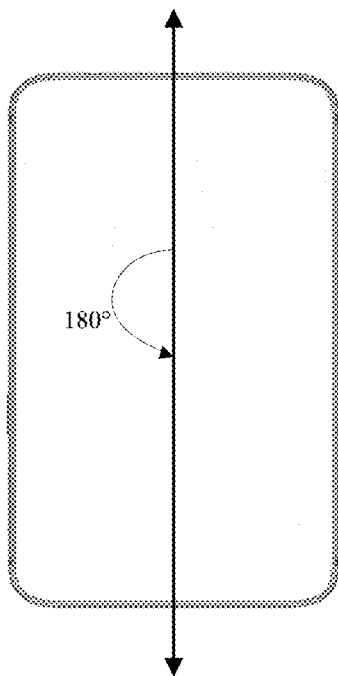
FIG. 14 is a schematic diagram illustrating a display mode provided in an embodiment of the present disclosure.

The portrait display mode refers to that the display interface of the mobile terminal is not rotated, or is rotated around the center point by 180 degrees. Optionally, in the present disclosure, the display mode that the display interface is not rotated is called as a positive portrait display mode. Referring to FIG. 13, the display interface is not rotated. The display mode that the display interface is rotated around the center point by 180 degrees is called as a negative portrait display mode. Referring to FIG. 14, the display interface is rotated around the center point by 180 degrees.

Optionally, calling the display mode that the display interface is not rotated as the positive portrait display mode and calling the display mode that the display interface is rotated around the center point by 180 degrees as the negative portrait display mode are taken as examples in embodiments for illustrating. In practical implementations, calling the display mode that the display interface is not rotated as the negative portrait display mode, and calling the display mode that the display interface is rotated around the center point by 180 degrees as the positive portrait display mode may be taken as examples for illustrating, which are not limited in the present disclosure.

The usage scenario of the mobile terminal includes an application currently running on the mobile terminal.

Figure 15:
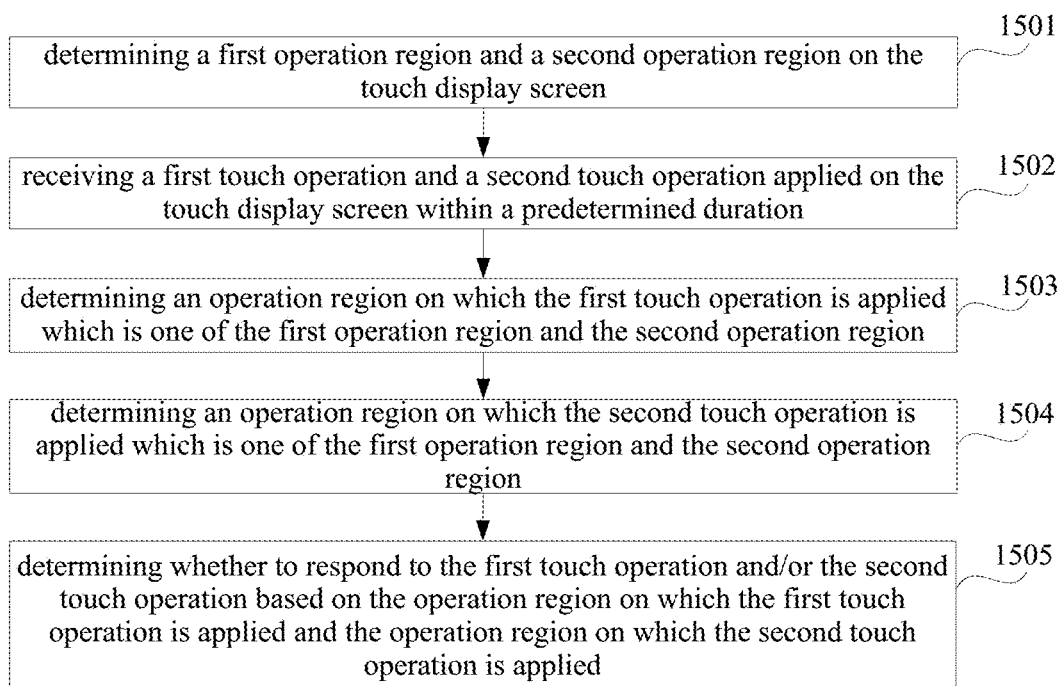
FIG. 15 is a flow chart illustrating a method for responding to a touch operation provided in an embodiment of the present disclosure.

FIG. 15 is a flow chart illustrating a method for responding to a touch operation provided in another exemplary embodiment of the present disclosure. The method for responding to a touch operation includes the followings.

In block 1501, the first operation region and the second operation region on the touch display screen are determined.

Optionally, determining the first operation region and the second operation region on the touch display screen includes, but is not limited to the followings.

In an embodiment, the holding manner of the mobile terminal is determined and the first operation region and the second operation region are determined based on the holding manner.

Optionally, in an embodiment, determining, by the mobile terminal, the holding manner of holding the mobile terminal includes but is not limited to the followings.

In an embodiment, the holding manner is determined, by the mobile terminal, based on fingerprint information of the touch operation received.

Template information of fingers of the left hand and template information of fingers of the right hand are stored in advance in the mobile terminal. A fingerprint sensor is set in the touch display screen of the mobile terminal. The fingerprint sensor is configured to collect fingerprint information of the touch operation applied on the touch display screen. When the touch operation is received by the mobile terminal, the fingerprint information of the touch operation is collected by the fingerprint sensor, and the fingerprint information is matched to the template information. When all fingerprint information collected for n times is matched to the template information of the fingers of the left hand, it is determined that the holding manner is the left hand holding manner. When all fingerprint information collected for n times is matched to the template information of the fingers of the right hand, it is determined that the holding manner is the right hand holding manner. When some of the fingerprint information collected for n times is matched to the template information of the fingers of the left hand, while some of the fingerprint information collected for n times is matched to the template information of the fingers of the right hand, it is determined that the holding manner is the both hands holding manner.

In an embodiment, the holding manner is determined, by the mobile terminal, based on the number of touch operations received on the edge regions at a same time.

Optionally, the left edge region and the right edge region of the mobile terminal are parts of the touch display region (for the curved surface screen). The mobile terminal is configured to receive the touch operations via the parts of the touch display screen on the edge regions. Optionally, at least one of a pressure sensor, a thermal sensor and a capacitance sensor is arranged in the left edge region and the right edge region of the mobile terminal. The mobile terminal is configured to receive the touch operations via the at least one sensor.

When the mobile terminal is held in the right hand holding manner by the user, the number of touch operations simultaneously received in the left edge region is generally greater than the number of touch operations simultaneously received in the right edge region. When the mobile terminal is held by the user in the left hand holding manner, the number of touch operations simultaneously received in the right edge region is generally greater than the number of touch operations simultaneously received in the left edge region. When the mobile terminal is held by the user in the both hand holding manner, the number of touch operations simultaneously received in the left edge region is generally equal to the number of the touch operations simultaneously received in the right edge region.

According to the above regulars, when the number of the touch operations received in the left edge region is greater than the number of the touch operations received in the right edge region, it is determined that the holding manner is the right hand holding manner. When the number of the touch operations received in the right edge region is greater than the number of the touch operations received in the left edge region, it is determined that the holding manner is the left hand holding manner. When the number of the touch operations received in the left edge region is equal to the number of the touch operations received in the right edge region, it is determined that the holding manner is the both hand holding manner.

Certainly, the holding manner of the mobile terminal may be determined in other manners which are not listed in embodiments.

Determining, by the mobile terminal, the first operation region and the second operation region based on the holding manner includes the followings. When the holding manner is the right hand holding manner, it is determined that the second operation region includes a right hand side edge region and an area of the right hand side edge region in the second operation region is greater a first predetermined value. When the holding manner is the left hand holding manner, it is determined that the second operation region includes a left hand side edge region, and an area of the left hand side edge region in the second operation region is greater than a second predetermined value. When the holding manner is the both hand holding manner, it is determined that the second operation region includes the left hand side edge region and the right hand side edge region, and the area of the left hand side edge region in the second operation region is greater than a third predetermined value, and the area of the left hand side edge region in the second operation region is greater than a fourth predetermined value.

The first predetermined value, the second predetermined value, the third predetermined value and the fourth predetermined value are all greater than 0. The first predetermined value, the second predetermined value, the third predetermined value and the fourth predetermined value may be equal to each other, or may be different from each other. The first predetermined value, the second predetermined value, the third predetermined value and the fourth predetermined value are not limited in embodiments.

Optionally, the first predetermined value, the second predetermined value, the third predetermined value and the fourth predetermined value may be customized by the user, or may be set by default by the mobile terminal.

The left hand side edge region refers to an edge region touched by the palm of the left hand on the touch display screen. The right hand side edge region refers to an edge region touched by the palm of the right hand on the touch display screen.

Optionally, the left hand side edge region may be one of the left edge region, the right edge region, the top edge region and the bottom edge region. The right hand side edge region is opposite to the left hand side edge region.

Since a range of the right hand side edge region touched accidentally by the right hand is large when the mobile terminal is held in the right hand holding manner, and a range of the right hand side edge region touched accidentally by the left hand is large when the mobile terminal is held in the left hand holding manner, it is determined that the second operation region includes the right hand side edge region and the area of the right hand side edge region in the second operation region is greater than the first predetermined value, when the holding manner is the right hand holding manner, which may reduce the probability of responses of the mobile terminal to the accidental operations applied on the right hand side edge region. Similarly, when the holding manner is the left hand holding manner, it is determined that the second operation region includes the left hand side edge region and the area of the left hand side edge region in the second operation region is greater than the second predetermined value, which may reduce the probability of the responses of the mobile terminal to accidental operations applied on the left hand side edge region. Similarly, when the holding manner is the both hand holding manner, it is determined that the second operation region includes the left hand side edge region and the right hand side edge region, and the area of the left hand side edge region in the second operation region is greater than the third predetermined value and the area of the right hand side edge region in the second operation region is greater than the fourth predetermined value, which may reduce the probability of responses of the mobile terminal to the accidental operations applied on the left hand side edge region and may reduce the probability of responses of the mobile terminal to the accidental operations applied on the right hand side edge region.

Figure 16:
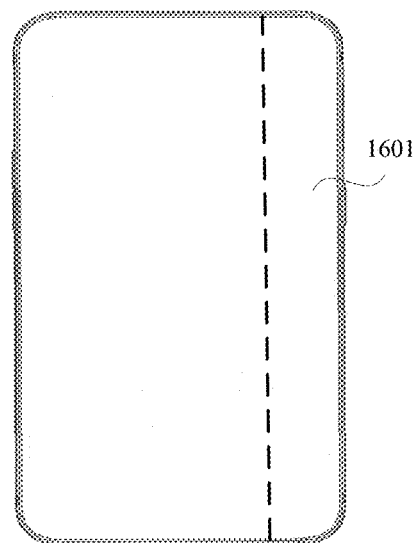
FIG. 16 is a schematic diagram illustrating a second operation region provided in an embodiment of the present disclosure.

In an example, referring to FIG. 16, when the mobile terminal determines that the holding manner is the right hand holding manner, the second operation region includes the right hand side edge region 1601, and the area of the right hand side edge region 1601 is greater than the first predetermined value.

Figure 17:
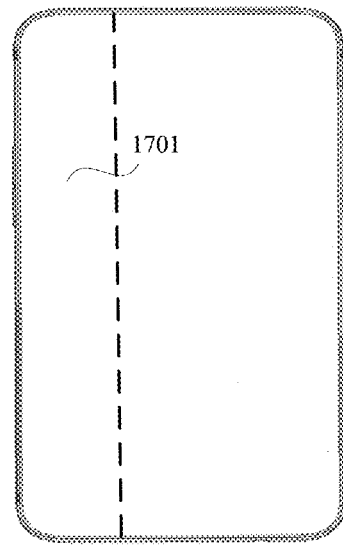
FIG. 17 is a schematic diagram illustrating a second operation region provided in an embodiment of the present disclosure.

In an example, referring to FIG. 17, when the mobile terminal determines that the holding manner is the left hand holding manner, the second operation region includes the left hand side edge region 1701, and the area of the left hand side edge region 1701 is greater than the second predetermined value.

Figure 18:
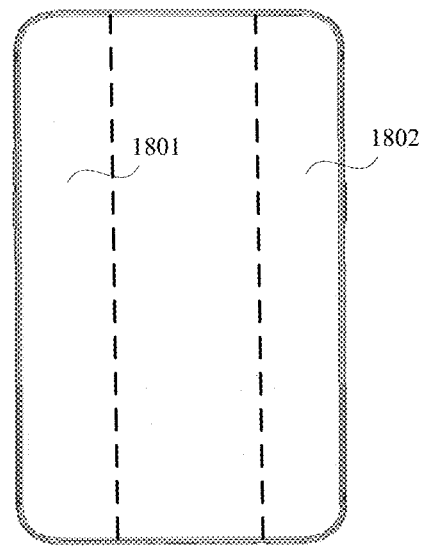
FIG. 18 is a schematic diagram illustrating a second operation region provided in an embodiment of the present disclosure.

In an example, referring to FIG. 18, when the mobile terminal determines that the holding manner is the both hand holding manner, the second operation region includes left hand side edge region 1801 and the right hand side edge region 1802. The area of the left hand side edge region 1801 is greater than the third predetermined value and the area of the right hand side edge region 1802 is greater than the fourth predetermined value.

It is to be complementally illustrated that, determining the first operation region and the second operation region based on the holding manner is taken as an example in embodiment for illustrating. In practical implementations, the way for determining the first operation region and the second operation region based on the holding manner may include others. For example, when the holding manner is the right hand holding manner, it is determined that the second operation region includes the right hand side edge region and the left hand side edge region, and the area of the right hand side edge region is greater than the area of the left hand side edge region. When the holding manner is the left hand holding manner, it is determined that the second operation region includes the right hand side edge region and the left hand side edge region, and the area of the right hand side edge region is smaller than the area of the left hand side edge region. When the holding manner is the both hand holding manner, it is determined that the second operation region includes the right hand side edge region and the left hand side edge region, and the area of the right hand side edge region is equal to the area of the left hand side edge region. Determining the first operation region and the second operation region based on the holding manner is not limited in embodiments.

In an embodiment, the display mode of the mobile terminal is determined, and the first operation region and the second operation region are determined based on the display mode.

Optionally, determining the display mode by the mobile terminal includes, but is not limited to the followings.

In an embodiment, indication information of the display mode is acquired, and a corresponding display mode is determined, by the mobile terminal, based on the indication information.

Optionally, the indication information may be represented as a character string. Schematically, the indication information 00 indicates to display in the positive portrait display mode, the indication information 01 indicates to display in the negative portrait display mode, the indication information 10 indicates to display in the positive landscape display mode, and the indication information 11 indicates to display in the negative landscape display mode.

In an embodiment, acceleration information is acquired, and a corresponding display mode is determined, by the mobile terminal, based on the acceleration information.

Optionally, an acceleration sensor is arranged in the mobile terminal, such as a gravity sensor (G-sensor). The acceleration sensor is configured to collect the acceleration information of the mobile terminal. The acceleration information is used to indicate a gesture of the mobile terminal. Since the user may rotate the mobile terminal to a corresponding gesture to view the display interface when the display interface of the mobile terminal is displayed in a specific display mode, the display mode of the mobile terminal may be determined by acquiring the gesture of the mobile terminal.

For example, when the acceleration information is (0, 9.81, 0), a corresponding display mode is the positive portrait display mode. When the acceleration information is (−9.81, 0, 0), a corresponding display mode is the positive landscape display mode. When the acceleration information is (9.81, 0, 0), a corresponding display mode is the negative landscape display mode. When the acceleration information is (0, −9.81, 0), a corresponding display mode is the negative portrait display mode.

Certainly, the mobile terminal may determine the display mode in other manners which are not listed in embodiments.

Optionally, determining, by the mobile terminal, the first operation region and the second operation region based on the display mode includes the followings. When the display mode is the portrait display mode, the second operation region includes the left edge region and the right edge region. When the display mode is the landscape display mode, the second operation region includes the top edge region and the bottom edge region.

Since ranges for accidental operation in the top edge region and in the bottom edge region are large when the display mode of the mobile terminal is the landscape display mode, it is determined that the second operation region includes the top edge region and the bottom edge region when the display mode is the landscape display mode. Therefore, the probability of response to the accidental operations applied on the top edge region and on the bottom edge region is reduced. It is determined that the second operation region includes the left edge region and the right edge region when the display mode is the portrait display mode. Therefore, the probability of response to the accidental operations applied on the left edge region and on the right edge region is reduced.

Figure 19:
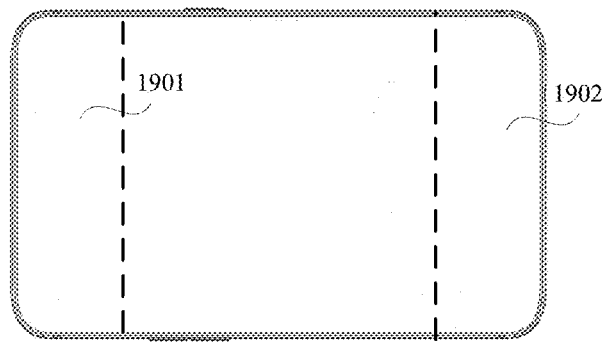
FIG. 19 is a schematic diagram illustrating a second operation region provided in an embodiment of the present disclosure.

In an example, referring to FIG. 19, the display mode is the landscape display mode, and the second operation region includes the top edge region 1901 and the bottom edge region 1902.

Figure 20:
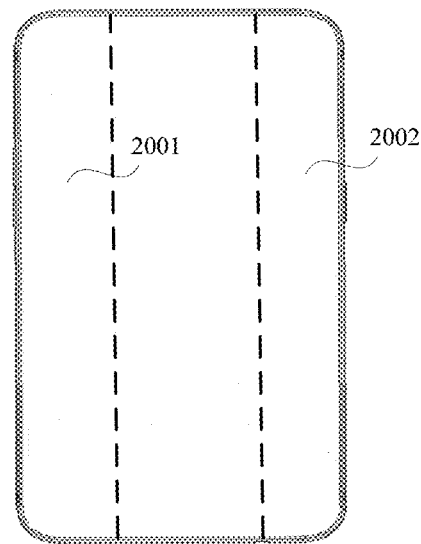
FIG. 20 is a schematic diagram illustrating a second operation region provided in an embodiment of the present disclosure.

In an example, referring to FIG. 20, the display mode is the portrait display mode, and the second operation region includes the left edge region 2001 and the right edge region 2002.

It is to be complementally illustrated that, determining the first operation region and the second operation region based on the display mode is taken as an example in embodiments for illustrating. In practical implementations, determining the first operation region and the second operation region based on the display mode may be in other manners. For example, when the display mode is the portrait display mode, the second operation region includes the left edge region, the right edge region, the top edge region and the bottom edge region. The area of the left edge region and the area of the right edge region are both greater than the area of the top edge region, and the area of the left edge region and the area of the right edge region are both greater than the area of the bottom edge region. When the display mode is the landscape display mode, the second operation region includes the left edge region, the right edge region, the top edge region and the right edge region. The area of the top edge region and the area of the bottom edge region are both greater than the area of the left edge region, and the area of the top edge region and the area of the bottom edge region are both greater than the area of the right edge region. Determining the first operation region and the second operation region based on the display mode is not limited in embodiments.

In an embodiment, a usage scenario of the mobile terminal is determined, and the first operation region and the second operation region are determined based on the usage scenario.

Optionally, the usage scenario of the mobile terminal includes an application currently running in the mobile terminal.

Optionally, determining the usage scenario by the mobile terminal includes acquiring a package name corresponding to a main activity currently running, and determining a corresponding application based on the package name.

Optionally, determining the first operation region and the second operation region based on the usage scenario includes the followings. When the currently running application in the mobile terminal is a video playing typed application or a game typed application, it is determined that the second operation region includes the top edge region and the bottom edge region. When the currently running application in the mobile terminal is a voice communication typed application, it is determined that the second operation region includes the left edge region and the right edge region.

Since the display mode is generally the landscape display mode when the video playing typed application and the game typed application is running, and the holding manner of holding the mobile terminal by the user is the both hand holding manner, the range of accidental touches in the top edge region and in the bottom edge region is large, it is determined that the second operation region includes the top edge region and the bottom edge region when the currently running application in the mobile terminal is the video playing typed application and the game typed application. Therefore, the probability of responses of the mobile terminal to the accidental operations applied on the top edge region and on the bottom edge region is reduced.

Since the display mode of the mobile terminal is generally the portrait display mode when the voice communication typed application is running, the range of accidental touches in the left edge region and in the right edge region is large, it is determined that the second operation region includes the left edge region and the left edge region when the currently running application in the mobile terminal is the voice communication typed application. Therefore, the probability of responses of the mobile terminal to the accidental operations on the left edge regions and on the right edge regions is reduced.

It is to be complementally illustrated that, the manner of determining the first operation region and the second operation region based on the usage scenario is taken as an example in embodiments for illustrating. In practical implementations, determining the first operation region and the second operation region based on the usage scenario may be in other manners. For example, the first operation region and the second operation region are determined based on other types of applications. The manner of determining the first operation region and the second operation region based on the usage scenario is not limited in embodiments.

Optionally, in the present disclosure, the first operation region and the second operation region may be determined according to any one of the holding manner, the display mode and the usage scenario.

In block 1502, a first touch operation applied on the touch display screen and a second touch operation applied on the touch display screen within a predetermined duration are received.

Relevant descriptions to this block are referred to block 701, which are not elaborated in embodiments.

In block 1503, the operation region on which the first touch operation is applied is determined. The operation region on which the first touch operation is applied is one of the first operation region and the second operation region.

Relevant descriptions to this block are referred to block 702, which are not elaborated in embodiments.

In block 1504, the operation region on which the second touch operation is applied is determined. The operation region on which the second touch operation is applied is one of the first operation region and the second operation region.

Relevant descriptions to this block are referred to the block 703, which are not elaborated herein.

In block 1505, it is determined whether to respond to the first touch operation and/or the second touch operation based on the operation region on which the first touch operation is applied and the operation region on which the second touch operation is applied.

Relevant descriptions to this block are referred to block 704, which are not elaborated in embodiments.

In conclusion, with the method for responding to a touch operation provided in embodiments, when at least two touch operations are received by the mobile terminal, it is determined whether to respond to the touch operations based on the operation region on which each of the touch operations is applied. A problem of wasting running resources of the mobile terminal due to a direct response of the mobile terminal to a touch operation when the touch operation is received and the touch operation is an accidental operation may be solved. Since the mobile terminal may determine whether to respond to the touch operation based on a decision whether the operation region has a high probability of occurrence of the accidental operation, the probability of responses of the mobile terminal to the accidental operations is reduced.

In addition, the first operation region and the second operation region are determined in different manners, such that the first operation region and the second operation region may be dynamically adapted to the current usage situation of the mobile terminal, thereby improving the flexibility of configuring the first operation region and the second operation region.

Optionally, in the above method for responding to a touch operation, when receiving at least two touch operations, the mobile terminal can only determine whether to respond to the touch operations applied on different operation regions. For various touch operations applied on a same operation region, the mobile terminal is unable to determine whether to respond to the various touch operations.

In order to ensure that the mobile terminal may determine whether to respond to the various touch operations applied on the same operation region, the present disclosure further provides following embodiments.

Figure 21:
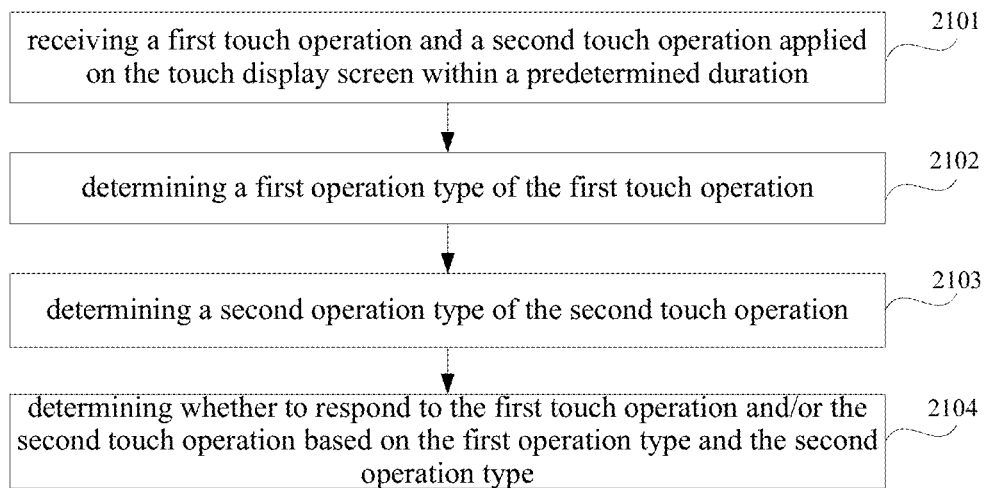
FIG. 21 is a flow chart illustrating a method for responding to a touch operation provided in an embodiment of the present disclosure.

FIG. 21 is a flow chart illustrating a method for responding to a touch operation provided in an exemplary embodiment of the present disclosure. The method for responding to a touch operation includes the followings.

In block 2101, the first touch operation and the second touch operation applied on the touch display screen within the predetermined duration are received.

Relevant descriptions to this block are referred to the block 701, which are not elaborated in embodiments.

In block 2102, the first operation type of the first touch operation is determined.

The operation type (including the first operation type and the second operation type) includes one of a click type, a slide type and a long press type.

Optionally, the mobile terminal determines the operation type of the touch operation according to a touch duration and/or a displacement of the touch operation (including the first touch operation and the second touch operation).

Schematically, when the touch duration is less than or equal to the first duration threshold and the displacement is unchanged, it is determined that the operation type of the touch operation is the click type. When the touch duration is greater than the first duration threshold and is less than or equal to the second duration threshold, and the displacement is changed, it is determined that the touch operation is the slide operation. When the touch duration is greater than the first duration threshold and is less than or equal to the third duration threshold, and the displacement is unchanged, it is determined that the touch operation is the long press operation.

In block 2103, the second operation type of the second touch operation is determined.

Relevant descriptions to this block are referred to the block 2102, which are not elaborated in embodiments.

In block 2104, it is determined whether to respond to the first touch operation and/or the second touch operation based on the first operation type and the second operation type.

Optionally, a response priority of the first operation type is higher than the response priority of the second operation type. Determining by the mobile terminal whether to respond to the first touch operation and/or the second touch operation based on the first operation type and the second operation type includes responding to the first touch operation and not responding to the second touch operation, or responding to the second touch operation after responding to the first touch operation.

The first operation type is the click type and the second operation type is at least one of the slide type and the long press type. Optionally, the first operation type is the slide type and the second operation type is the long press type.

Since during the usage of the mobile terminal, the probability that the long press typed touch operation is an accidental operation is higher than the probability that the slide typed touch operation is an accidental operation, and the probability that the slide typed touch operation is an accidental operation is higher than the probability that the click typed touch operation is an accidental operation, the probability of responses of the mobile terminal to the accidental operation is reduced by only responding to or preferentially responding to the touch operation having a low probability that the touch operation is the accidental operation, in the present disclosure.

Optionally, when both the first operation type and the second operation type are the long press type, the probability that the first touch operation is the accidental operation and the probability that the second touch operation is the accidental operation are both high. Therefore, the mobile terminal is configured to not respond to the first touch operation and the second touch operation when both the first operation type and the second touch operation are the long press type, thereby reducing the probability of responses of the mobile terminal to the accidental operation.

In conclusion, with the method for responding to a touch operation provide in embodiments, when at least two touch operations are received by the mobile terminal, it is determined whether to respond to the touch operations based on the operation type of each of the touch operations. A problem of wasting running resources of the mobile terminal due to a direct response of the mobile terminal to the touch operation when the touch operation is received and the touch operation is the accidental operation may be solved. Since the mobile terminal may determine whether to respond to the touch operation based on a decision whether the operation type has a high probability of occurrence of the accidental operation, the probability of responses of the mobile terminal to the accidental operation is reduced.

Optionally, in embodiments illustrated as FIG. 21, the response priorities of the operation types are fixed to that, the response priority of the click type is higher than the response priority of the slide type, and the response priority of the slide type is higher than the response priority of the long press type. However, in certain usage scenarios, the response priorities of the operation types are different from the above. For example, in a scenario of chatting, the probability that the slide typed touch operation is the accidental operation is higher than the probability that the long press typed touch operation is the accidental operation, and the probability that the long press typed touch operation is the accidental operation is higher than the probability that the click typed touch operation is the accidental operation. Therefore, the response priority of the click type is higher than the response priority of the long press type, and the response priority of the long press type is higher than the response priority of the slide type. Therefore, in order to reduce the probability of responses of the mobile terminal to the accidental operation, the present disclosure further provides following embodiments.

Figure 22:
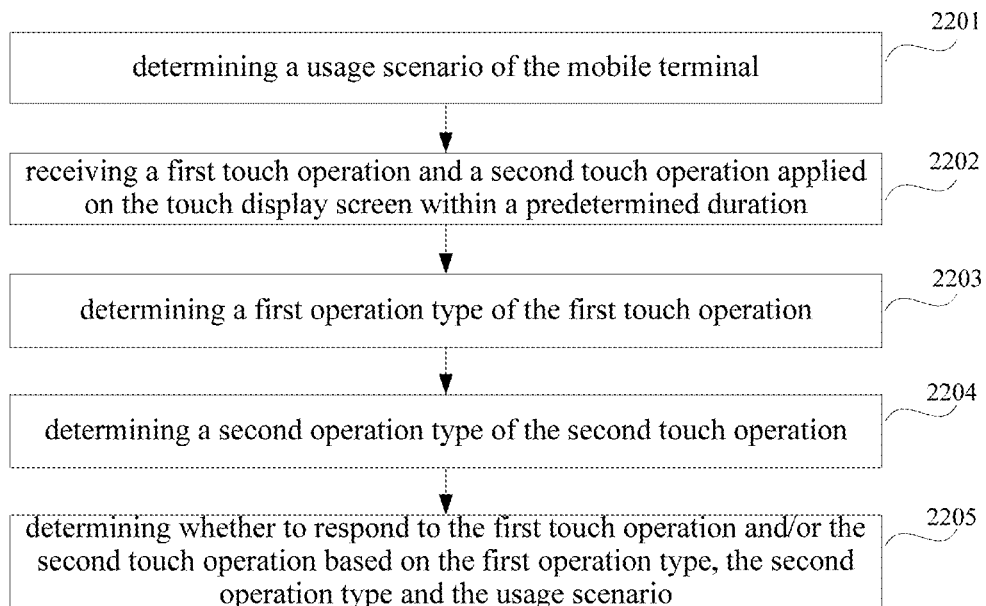
FIG. 22 is a flow chart illustrating a method for responding to a touch operation provided in an embodiment of the present disclosure.

FIG. 22 is a flow chart illustrating a method for responding to a touch operation provided in another exemplary embodiment of the present disclosure. The method for responding to a touch operation includes the followings.

In block 2201, the usage scenario of the mobile terminal is determined.

Relevant descriptions to this block are referred to the descriptions of determining the usage scenario in the block 1501, which are not elaborated in embodiments.

In block 2202, the first touch operation applied on the touch display screen and the second touch operation applied on the touch display screen within the predetermined duration are received.

Relevant descriptions to this block are referred to the block 701, which are not elaborated in embodiments.

In block 2203, the first operation type of the first touch operation is determined.

Relevant descriptions to this block are referred to the block 2102, which are not elaborated in embodiments.

In block 2204, the second operation type of the second touch operation is determined.

Relevant descriptions to this block are referred to the block 2102, which are not elaborated in embodiments.

In block 2205, it is determined whether to respond to the first touch operation and/or the second touch operation based on the first operation type, the second operation type and the usage scenario.

The mobile terminal is configured to determine the response priority of the first operation type and the response priority of the second operation type based on the usage scenario. In addition, the mobile terminal is configured to determine whether to respond to the first touch operation and/or the second touch operation based on the response priority of the first operation type and the response priority of the second operation type.

Optionally, the usage scenario is a first predetermined scenario, and it is determined that the response priority of the click operation is higher than the response priority of the slide type, and the response priority of the slide type is higher than the response priority of the long press type. Optionally, the usage scenario is a second predetermined scenario, and it is determined that the response priority of the click type is higher than the response priority of the long press type, and the response priority of the long press type is higher than the response priority of the slide type. Optionally, the usage scenario is a third predetermined scenario, and it is determined that the response priority of the slide type is higher than the response priority of the click type, and the response priority of the click type is higher than the response priority of the long press type.

Optionally, the first predetermined scenario includes at least one program type, at least one application and/or at least one display interface. For example, the first predetermined scenario includes a home interface and a shopping typed application.

Optionally, the second predetermined scenario includes at least one program type, at least one application and/or at least one display interface. For example, the second predetermined scenario includes a chat typed interface.

Optionally, the third predetermined scenario includes at least one program type, at least one application and/or at least one display interface. For example, the third predetermined scenario includes a game interface.

Relevant descriptions to determining whether to respond to the first touch operation and/or the second touch operation based on the response priority of the first operation type and the respond priority of the second operation type are referred to the block 2104, which are not elaborated in embodiments.

In conclusion, with the method for responding to a touch operation provided in embodiments, when at least two touch operations are received by the mobile terminal, it is determined whether to respond to the touch operations based on the operation type of each of the touch operations. A problem of wasting running resources of the mobile terminal due to a direct response of the mobile terminal to the touch operation when the touch operation is received and the touch operation is the accidental operation may be solved. Since the mobile terminal may determine whether to respond to the touch operation based on a decision whether the operation type of the touch operation is the accidental operation, the probability of responses of the mobile terminal to the accidental operation is reduced.

In addition, by determining the response priorities of the operation types based on the usage scenario, the mobile terminal is able to flexibly switch among the response priorities of the operation types based on various usage scenarios, thereby reducing the probability of responses of the mobile terminal to the accidental operation.

Optionally, in order to improve an accuracy of responses of the mobile terminal to the touch operation, the mobile terminal is configured to determine whether to respond to the touch operation based on the operation region of the touch operation and the operation type of the touch operation in the present disclosure. The present disclosure further provides following embodiments.

FIG. 23 is a flow chart illustrating a method for responding to a touch operation provided in another exemplary embodiment of the present disclosure. The method for responding to a touch operation includes the following.

In block 2301, the touch operation on the touch display screen is received.

Optionally, at least one touch operation on the touch display screen is received by the mobile terminal. Relevant descriptions to this block are referred to the block 701, which are not elaborated in embodiments.

In block 2302, the operation region on which the touch operation is applied is determined. The touch display screen includes the first operation region and the second operation region. The operation region on which the touch operation is applied is at least one of the first operation region and the second operation region.

Relevant descriptions to this block are referred to the block 702, which are not elaborated herein.

In block 2303, the operation type of the touch operation is determined.

Relevant descriptions to this block are referred to the block 2102, which are not elaborated in embodiments.

In block 2304, it is determined whether to respond to the touch operation based on the operation region and the operation type.

The response priority of the touch operation applied on the first operation region is higher than the response priority of the touch operation applied on the second operation region. The operation type includes a click type, a slide type and a long press type.

In a first scenario, one touch operation is applied on the touch display screen. When the operation region on which the touch operation is applied is the first operation region, the touch operation is responded to. Since a probability that an accidental operation is applied on the first operation region is relatively low, the probability that the touch operation applied to the first operation region and responded to by the mobile terminal is the accidental operation is low.

When the operation region is the second operation region, and the operation type is the click type or the slide type, the touch operation is responded to. When the operation region is the second operation region, and the operation type is the long press type, the touch operation is not responded to.

Since the probability that the long press type is an accidental operation is high, and the probability that the touch operation applied on the second operation region is an accidental operation is low, the touch operation is not responded to when the operation region is the second operation region and the operation type is the long press type, thereby reducing the probability of responses of the mobile terminal to the accidental operation.

In a second scenario, at least two touch operations are applied on the touch display screen. In the block 2301, the mobile terminal is configured to receive the first touch operation and the second touch operation on the touch display screen. In the block 2302, the mobile terminal is configured to determine the operation region on which the first touch operation is applied and determine the operation region on which the second touch operation is applied. In the block 2303, the mobile terminal is configured to determine the first operation type of the first touch operation and the second operation type of the second touch operation.

Optionally, a response rule is stored in the mobile terminal. The response rule is configured to indicate whether to respond to the touch operation within a certain operation region and having a certain operation type. Referring to the response rule illustrated as FIG. 24, it can be seen from the response rule, when the mobile terminal receives the first touch operation and the second touch operation at the same time and the operation type of the first touch operation is same with the operation type of the second touch operation or the operation type of the first touch operation is the click type or the slide type, the mobile terminal is configured to preferentially respond to the first touch operation. When the operation type of the first touch operation is different from the operation type of the second touch operation and the operation type of the first touch operation is the long press type, the mobile terminal is configured to preferentially respond to the second operation type. When the mobile terminal only receives the first touch operation, the mobile terminal is configured to respond to the first touch operation. When the mobile terminal only receives the second touch operation and the operation type of the second touch operation is the click type or the slide type, the mobile terminal is configured to respond to the second touch operation. When the mobile terminal only receives the second touch operation and the operation type of the second touch operation is the long press type, the mobile terminal is configured to not respond to the second touch operation.

Optionally, response priorities corresponding to the operation regions and response priorities corresponding to the operation types are stored in advance in the mobile terminal. When the operation region on which the first touch operation is applied is the first operation region, and the operation region on which the second touch operation is applied is the second operation region and the response priority of the second operation type is higher than the response priority of the first operation type (that is, the response priorities corresponding to the operation regions are contrary to the response priorities corresponding to the operation types), the mobile terminal is configured to determine a priority level of the operation region and a priority level of the operation type, and to determine whether to respond to the first touch operation and/or the second touch operation based on the priority levels.

The priority level is configured to indicate to respond to the touch operations according to the response priorities corresponding to the operation regions. Optionally, the priority level is configured to indicate to respond to the touch operations according to the response priorities corresponding to the operation types.

The response priority of the click type is higher than the response priority of the slide type, and the response priority of the slide type is higher than the response priority of the long press type.

Schematically, when the first operation type is the click type or the slide type, it is determined that the priority level corresponding to the operation region are higher than the priority level corresponding to the operation type. The mobile terminal is configured to respond to the first touch operation and/or the second touch operation based on the response priorities corresponding to the operation regions.

For example, the first operation type is the slide type and the second operation type is the click type. Therefore, the response priority of the first touch operation applied on the first operation region is higher than the response priority of the second touch operation applied on the second operation region, while the response priority of the first touch operation having the first operation type is lower than the response priority of the second touch operation having the second operation type. The mobile terminal is configured to determine that the priority level of the operation region is higher than the priority level of the operation type. That is, the mobile terminal is configured to preferentially respond to the first touch operation and then response to the second touch operation, or only respond to the first touch operation, based on the response priorities corresponding to the operation regions.

Schematically, when the first operation type is the long press type, it is determined that the priority level of the operation type is higher than the priority level of the operation region.

For example, the first operation type is the long press type and the second operation type is the click type. Therefore, the response priority of the first touch operation applied on the first operation region is higher than the response priority of the second touch operation applied on the second operation region, while the response priority of the first touch operation having the first operation type is lower than the response priority of the second touch operation having the second operation type. The mobile terminal is configured to determine that the priority level of the operation region is lower that the priority level corresponding to the operation type. That is, the mobile terminal is configured to preferentially respond to the second touch operation and then respond to the first touch operation, or only respond to the second touch operation, based on the response priorities corresponding to the operation regions.

In conclusion, with the method for responding to a touch operation provided in embodiments, by determining whether to response to the touch operation according to the operation type and operation region of the touch operation, a problem of wasting running resources of the mobile terminal due to a direct response of the mobile terminal to touch operation when the touch operation is received and the touch operation is the accidental operation may be solved. Since the mobile terminal may determine whether to respond to the touch operation based on a decision whether the operation region has a high probability of occurrence of the accidental operation and based on a decision whether the operation type has a high probability of occurrence of the accidental operation, the probability of response of the mobile terminal to the accidental operation is reduced.

Optionally, when the mobile terminal receives at least three touch operations simultaneously, the above procedures are performed on any two of the at least three touch operations, until it is determined which touch operation is responded to.

Optionally, the first operation region and the second operation region on the touch display screen may be set by default when the mobile terminal is shipped from the factory, or may be determined according to the holding manner of holding the mobile terminal by the user and/or the gesture information of the mobile terminal. Determining the first operation region and the second operation region based on the holding manner of holding the mobile terminal and/or the display mode of the mobile terminal and/or the usage scenario of the mobile terminal is taken as an example in embodiments for illustrating.

Figure 25:
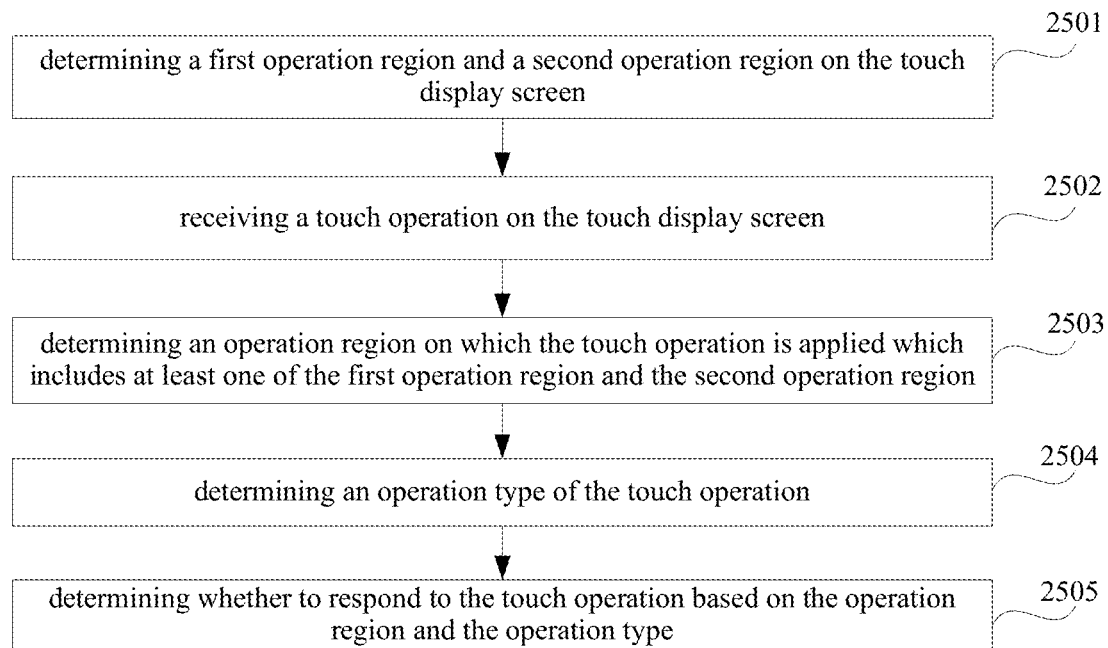
FIG. 25 is a flow chart illustrating a method for responding to a touch operation provided in an embodiment of the present disclosure.

FIG. 25 is a flow chart illustrating a method for responding to a touch operation provided in another exemplary embodiment of the present disclosure. The method for responding to a touch operation includes the following.

In block 2501, the first operation region and the second operation region of the touch display screen are determined.

Relevant descriptions to this block are referred to the block 1501, which are not elaborated in embodiments.

In block 2502, the touch operation applied on the touch display screen is received.

Relevant descriptions to this block are referred to the block 2301, which are not elaborated in embodiments.

In block 2503, the operation region on which the touch operation is applied is determined. The operation region on which the touch operation is applied is one of the first operation region and the second operation region.

Relevant descriptions to this block are referred to the block 2302, which are not elaborated in embodiments.

In block 2504, the operation type of the touch operation is determined.

Relevant descriptions to this block are referred to the block 2303, which are not elaborated in embodiments.

In block 2505, it is determined whether to respond to the touch operation based on the operation region and the operation type.

Relevant descriptions to this block are referred to the block 2304, which are not elaborated in embodiments.

In conclusion, with the method for responding to a touch operation provided in embodiments, by determining the first operation region and the second operation region in different manners, the first operation region and the second operation region are dynamically adapted to a current usage scenario of the mobile terminal, thereby improving a flexibility of configuring the first operation region and the second operation region.

Below are device embodiments of the present disclosure, which may be used to execute method embodiments of the present disclosure. Those details not disclosed in the device embodiments of the present disclosure may be referred to the method embodiments of the present disclosure.

Figure 26:
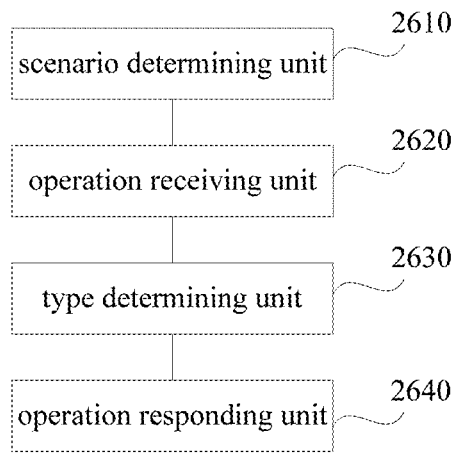
FIG. 26 is a block diagram illustrating a device for responding to a touch operation provided in an embodiment of the present disclosure.

Referring to FIG. 26, FIG. 26 illustrates a diagram block of a device for responding to a touch operation provided in an embodiment of the present disclosure. The device for responding to a touch operation may be realized as a part or a whole of the mobile terminal in software, in hardware or in a combination thereof. The device may be integrated to the mobile terminal. The mobile terminal includes a touch display screen. The device may include a scenario determining unit 2610, an operation receiving unit 3620, a type determining unit 2630 and an operation responding unit 2640.

The scenario determining unit 2610 is configured to determine a usage scenario of the mobile terminal.

The operation receiving unit 2620 is configured to receive a first touch operation applied on the touch display screen and a second touch operation applied on the touch display screen within a predetermined duration.

The type determining unit 2630 is configured to determine a first operation type of the first touch operation and is configured to determine a second operation type of the second touch operation.

The operation responding unit 2640 is configured to determine whether to respond to the first touch operation and/or the second touch operation based on the first operation type, the second operation type and the usage scenario.

Optionally, the operation responding unit 2640 is configured to determine a response priority of the first operation type and a response priority of the second operation type based on the usage scenario.

In addition, the operation responding unit 2640 is configured to determine whether to respond to the first touch operation and/or the second touch operation based on the response priority of the first operation type and the response priority of the second operation type.

Optionally, the first operation type is one of a click type, a slide type and a long press type. The second operation type is one of the click type, the slide type and the long press type.

The operation responding unit 2640 is configured to determine that the response priority of the click type is higher than the response priority of the slide type, and the response priority of the slide type is higher than the response priority of the long press type when the usage scenario is a first predetermined scenario.

Alternatively, the operation responding unit 2640 is configured to determine that the response priority of the click type is higher than the response priority of the long press type, and the response priority of the long press type is higher than the response priority of the slide type when the usage type is a second predetermined scenario.

Alternatively, the operation responding unit 2640 is configured to determine that the response priority of the slide type is higher than the response priority of the click type, and the response priority of the click type is higher than the response priority of the long press type when the usage scenario is a third predetermined scenario.

Optionally, the operation responding unit 2640 is configured to respond to the first touch operation and not respond to the second touch operation, or respond to the first touch operation and respond to the second touch operation after responding to the first touch operation, when the response priority of the first operation type is higher than the response priority of the second operation type.

Optionally, the scenario determining unit 2610 is configured to determine the usage scenario according to an application running in foreground of the mobile terminal.

Embodiments of the present disclosure further provide a computer readable medium, having program instructions stored thereon. When the program instructions are executed by a processor, the method for responding to a touch operation provided in each method embodiment is realized.

Another aspect of the present disclosure further provides a computer program product including program instructions. When the computer program product is running on a computer, the method described in each aspect is executed by the computer.

Those skilled in the art can understand that all or a part of the steps for realizing the above embodiments may be implemented in hardware, or may be implemented by instructing related hardware via programs. The programs may be stored in a computer readable storage medium. The storage medium mentioned may be a read only memory, a magnetic disk or an optical disk or the like.

The above is only preferred embodiments of the present application, and is not intended to limit the present disclosure. Any modifications, equivalent substitutions, improvements made within the spirit and principles of the present disclosure should be included in the protection scope of the present disclosure.

What is claimed is:

1. A method for responding to a touch operation, applicable to a mobile terminal comprising a touch display screen, and the method comprising:
    determining a first operation region of the touch display screen and a second operation region of the touch display screen based on fixed coordinate information of the touch display screen;
    receiving at least one touch operation applied on the touch display screen, the at least one touch operation comprising a first touch operation and a second touch operation;
    determining at least one operation region on which the at least one touch operation is applied, the at least one operation region comprising the first operation region and the second operation region, an operation region on which the first touch operation is applied is one of the first operation region and the second operation region, and an operation region on which the second touch operation is applied is the other one of the first operation region and the second operation region;
    determining at least one operation type of the at least one touch operation;
    determining response priorities of operation regions, response priorities of operation types, a priority level of the operation regions and a priority level of the operation types; and
    determining whether to respond to the first touch operation and/or the second touch operation based on the at least one operation region, the at least one operation type, the response priorities of operation regions, the response priorities of operation types, the priority level of the operation regions and the priority level of the operation types.

2. The method according to claim 1, wherein determining the first operation region and the second operation region in the touch display screen comprises:
    determining a holding manner of the mobile terminal, the holding manner comprising a left hand holding manner, a right hand holding manner, and a both hand holding manner; and
    determining the first operation region and the second operation region based on the holding manner.

3. The method according to claim 2, wherein determining a holding manner of the mobile terminal comprises:
    obtaining fingerprint information of the at least one touch operation on the touch display screen, and comparing the fingerprint information of the at least one touch operation with preset fingerprint information to determine the holding manner; or
    obtaining an amount of the at least one touch operation simultaneously applied on an edge region of the touch display screen to determine the holding manner.

4. The method according to claim 2, wherein determining the first operation region and the second operation region based on the holding manner comprises:
    in response to determining that the holding manner is the right hand holding manner, determining that the second operation region comprises a right hand side edge region and an area of the right hand side edge region is greater than a first predetermined value;
    in response to determining that the holding manner is the left hand holding manner, determining that the second operation region comprises a left hand side edge region and an area of the left hand side edge region is greater than a second predetermined value; and
    in response to determining that the holding manner is the both hand holding manner, determining that the second operation region comprises a left hand side edge region and a right hand side edge region, and an area of the left hand side edge region is greater than a third predetermined value and an area of the right hand side edge region is greater than a fourth predetermined value;
    the first predetermined value, the second predetermined value, the third predetermined value and the fourth predetermined value being greater than 0.

5. The method according to claim 1, wherein determining the first operation region and the second operation region in the touch display region comprises:
    determining a display mode of the mobile terminal, the display mode comprising a landscape display mode and a portrait display mode; and
    determining the first operation region and the second operation region based on the display mode.

6. The method according to claim 5, wherein determining a display mode of the mobile terminal comprises:
  obtaining instruction information relative to the display mode and determining the display mode based on the instruction information; or
  obtaining acceleration information of the mobile terminal, and determining the display mode based on the acceleration information.

7. The method according to claim 5, wherein determining the first operation region and the second operation region based on the display mode comprises:
  in response to determining that the display mode is the landscape display mode, determining that the second operation region comprises a left edge region and a right edge region; and
  in response to determining that the display mode is the portrait display mode, determining that the second operation region comprises a top edge region and a bottom edge region.

8. The method according to claim 1, wherein determining the first operation region and the second operation region in the touch display screen comprises:
  determining a usage scenario of the mobile terminal, the usage scenario comprising an application running currently on the mobile terminal; and
  determining the first operation region and the second operation region based on the usage scenario.

9. The method according to claim 8, wherein determining the first operation region and the second operation region based on the usage scenario comprises:
  in response to determining that the application running currently on the mobile terminal is an application of a first preset type, determining that the second operation region comprises a top edge region and a bottom edge region; and
  in response to determining that the application running currently on the mobile terminal is an application of a second preset type, determining that the second operation region comprises a left edge region and a right edge region;
  the first preset type comprising a video playing type and a game type; and the second preset type comprising a voice communication type.

10. The method according to claim 1, wherein,
  a response priority of a touch operation applied on the first operation region is higher than the response priority of a touch operation applied on the second operation region;
  the at least one operation type comprises a click type, a slide type and a long press type, the response priority of the click type is higher than the response priority of the slide type, and the response priority of the slide type is higher than the response priority of the long press type.

11. The method according to claim 10, wherein determining whether to respond to the first touch operation and/or the second touch operation based on the at least one operation region and the at least one operation type comprises:
  responding to the first touch operation and not responding to the second touch operation, in response to determining that the first touch operation is applied on the first operation region and the second touch operation is applied on the second operation region; or
  responding to the first touch operation and responding to the second touch operation after responding to the first touch operation, in response to determining that the first touch operation is applied on the first operation region and the second touch operation is applied on the second operation region.

12. The method of claim 1, further comprising:
  determining that the priority level of the operation regions is higher than the priority level of the operation types, when the first operation type of the first touch operation is the click type or the slide type; and
  determining that the priority level of the operation types is higher than the priority level of the operation regions, when the first operation type of the first touch operation is the long press type.

13. The method of claim 12, further comprising:
  responding to the first touch operation and then responding to the second touch operation, when the operation region of the first touch operation is a first operation region, the first operation type of the first touch operation is the click type or the slide type, the operation region of the second touch operation is a second operation region, and the second operation type of the second touch operation is the click type, the slide type or the long press type; or
  responding to the second touch operation and then responding to the first touch operation, when the operation region of the first touch operation is a first operation region, the first operation type of the first touch operation is the long press type, the operation region of the second touch operation is a second operation region, and the second operation type of the second touch operation is the click type or the slide type.

14. An electronic device, comprising a processor, a memory coupled to the processor and program instructions stored in the memory, wherein when the program instructions are executed by the processor, the processor is configured to:
  determine a first operation region of the touch display screen and a second operation region of the touch display screen based on fixed coordinate information of the touch display screen;
  receive at least one touch operation applied on the touch display screen, the at least one touch operation comprising a first touch operation and a second touch operation;
  determine at least one operation region on which the touch operation is applied, the at least one operation region comprising the first operation region and the second operation region; an operation region on which the first touch operation is applied is one of the first operation region and the second operation region, and an operation region on which the second touch operation is applied is the other one of the second operation region and the second operation region;
  determine at least one operation type of the at least one touch operation;
  determine response priorities of operation regions, response priorities of operation types, a priority level of the operation regions and a priority level of the operation types; and
  determine whether to respond to the first touch operation and/or the second touch operation based on the at least one operation region, the at least one operation type, the response priorities of operation regions, the response priorities of operation types, the priority level of the operation regions and the priority level of the operation types.

15. The electronic device according to claim 14, wherein processor is further configured to:

determine a holding manner of the mobile terminal, the holding manner comprising a left hand holding manner, a right hand holding manner, and a both hand holding manner; and determine the first operation region and the second operation region based on the holding manner.

16. The electronic device according to claim 14, wherein the processor is further configured to:

determine a display mode of the mobile terminal, the display mode comprising a landscape display mode and a portrait display mode; and determine the first operation region and the second operation region based on the display mode.

17. The electronic device according to claim 14, wherein the processor is further configured to:

determine a usage scenario of the mobile terminal, the usage scenario comprising an application running currently on the mobile terminal; and determine the first operation region and the second operation region based on the usage scenario.

18. The electronic device according to claim 14, wherein, a response priority of a touch operation applied on the first operation region is higher than the response priority of a touch operation applied on the second operation region;

the at least one operation type comprises a click type, a slide type and a long press type, the response priority of the click type is higher than the response priority of the slide type, and the response priority of the slide type is higher than the response priority of the long press type.

19. The electronic device according to claim 18, wherein the processor is further configured to:

respond to the first touch operation and not respond to the second touch operation, in response to determining that the first touch operation is applied on the first operation region and the second touch operation is applied on the second operation region; or respond to the first touch operation and respond to the second touch operation after responding to the first touch operation, in response to determining that the first touch operation is applied on the first operation region and the second touch operation is applied on the second operation region.

20. A non-transitory computer readable storage medium, having program instructions stored thereon, wherein when the program instructions are executed by a processor, the processor is configured to:

determine a first operation region of the touch display screen and a second operation region of the touch display screen based on fixed coordinate information of the touch display screen;

receive at least one touch operation applied on the touch display screen, the at least one touch operation comprising a first touch operation and a second touch operation;

determine at least one operation region on which the at least one touch operation is applied, the at least one operation region comprising the first operation region and the second operation region, an operation region on which the first touch operation is applied is one of the first operation region and the second operation region, and an operation region on which the second touch operation is applied is the other one of the second operation region and the second operation region;

determine at least one operation type of the at least one touch operation;

determine response priorities of operation regions, response priorities of operation types, a priority level of the operation regions and a priority level of the operation types; and determine whether to respond to the first touch operation and/or the second touch operation based on the at least one operation region, the at least one operation type, the response priorities of operation regions, the response priorities of operation types, the priority level of the operation regions and the priority level of the operation types.

* * * * *